United States Patent
Dalenberg et al.

(10) Patent No.: US 7,527,577 B2
(45) Date of Patent: *May 5, 2009

(54) AUTOMATIC TRANSMISSION AND GEAR TRAIN

(76) Inventors: Scott R. Dalenberg, 4876 E. Alameda Ct., Springfield, MO (US) 65809; Theodore V. Kachel, 3 Hampton Rd., Purchase, NY (US) 10544; John W. Creighton, 259 Washington Ave., Hickory, PA (US) 15340

(*) Notice: Subject to any disclaimer, the term of this patent is extended or adjusted under 35 U.S.C. 154(b) by 178 days.

This patent is subject to a terminal disclaimer.

(21) Appl. No.: 11/565,304

(22) Filed: Nov. 30, 2006

(65) Prior Publication Data

US 2007/0093353 A1    Apr. 26, 2007

Related U.S. Application Data

(63) Continuation of application No. 11/002,639, filed on Dec. 3, 2004, now Pat. No. 7,195,578.

(60) Provisional application No. 60/526,979, filed on Dec. 5, 2003, provisional application No. 60/526,978, filed on Dec. 5, 2003.

(51) Int. Cl.
*F16H 57/04* (2006.01)
*F16H 57/08* (2006.01)

(52) U.S. Cl. .................................. 475/331; 418/170

(58) Field of Classification Search .................. 475/331; 418/170, 171
See application file for complete search history.

(56) References Cited

U.S. PATENT DOCUMENTS

| 3,292,448 | A | * | 12/1966 | Roskopf et al. | 477/154 |
| 3,527,121 | A | * | 9/1970 | Moore | 475/338 |
| 5,163,826 | A | * | 11/1992 | Cozens | 418/170 |
| 6,089,841 | A | * | 7/2000 | Meernik et al. | 418/170 |
| 6,123,640 | A | * | 9/2000 | Schulz | 475/341 |
| 6,652,253 | B1 | * | 11/2003 | Crafton et al. | 418/170 |
| 6,672,850 | B2 | * | 1/2004 | Palazzolo et al. | 418/21 |
| 6,743,148 | B2 | * | 6/2004 | Hayabuchi et al. | 475/331 |

FOREIGN PATENT DOCUMENTS

KR    2004041964 A  *  5/2004

OTHER PUBLICATIONS 2 sheets of Form PTO-892 and 4 sheets of Form PTO-1449.

* cited by examiner

*Primary Examiner*—Tisha D Lewis
(74) *Attorney, Agent, or Firm*—Sullivan & Worcester LLP; John W. Ryan; Thomas M. Haas

(57) ABSTRACT

The present invention relates to automatic transmissions. In particular, the instant invention relates to an automatic transmission with improved resistance to deterioration with an increased effective life. The transmission of the instant invention comprises eight pinion gears assembled into one carrier utilizing a forward and a rear sun gear, a ring gear, a band drum and a one way roller clutch.

5 Claims, 49 Drawing Sheets

| EXTERNAL INVOLUTE SPLINE DATA ||
|---|---|
| NUMBER OF TEETH | 20 |
| NORMAL DIAMETRAL PITCH | 17 |
| NORMAL PRESSURE ANGLE | 18° |
| HELIX ANGLE | 18.08° |
| HAND | RIGHT |
| STANDARD PITCH DIAMETER | Ø 31.435 |
| MAJOR DIAMETER | Ø 36.50 ± 0.02 |
| MINOR DIAMETER | Ø 28.80 ± 0.05 |
| DIAMETER OF MEASURING PIN | Ø 3.0 |
| MEASUREMENT OVER 2 PINS | 37.576 ± 0.035 |
| NORMAL CIRCULAR TOOTH THICKNESS | 2.890 ± 0.018 |
| NORMAL TIP RADIUS | 0.25 |
| NORMAL FILLET RADIUS | FULL |
| TOTAL COMPOSITE TOLERANCE | 0.038 |
| TOOTH TO TOOTH TOLERANCE | 0.019 |
| MASTER GEAR NUMBER OF TEETH | 40 |
| MASTER GEAR NORM. CIRC TOOTH THICKNESS | 2.3470 |
| TEST RADIUS | 16.862 ± 0.054 |
| CROWNING | 0.03 |

Fig. 1c

| SPLINE DATA | |
|---|---|
| NUMBER OF TEETH | 15 |
| NORMAL DIAMETRAL PITCH | 17 |
| NORMAL PRESSURE ANGLE | 18° |
| HELIX ANGLE | 18.08° |
| HAND | LEFT |
| STANDARD PITCH DIAMETER | ⌀ 23.576 |
| MAJOR DIAMETER | ⌀ 28.40 ± 0.02 |
| MINOR DIAMETER | ⌀ 21.10 ± 0.05 |
| DIAMETER OF MEASURING PIN | ⌀ 3.3 |
| MEASUREMENT OVER 2 PINS | 30.324 ± 0.031 |
| NORMAL CIRCULAR TOOTH THICKNESS | 2.890 ± 0.018 |
| NORMAL TIP RADIUS | 0.25 |
| NORMAL FILLET RADIUS | FULL |
| TOTAL COMPOSITE TOLERANCE | 0.038 |
| TOOTH TO TOOTH TOLERANCE | 0.019 |
| MASTER GEAR NUMBER OF TEETH | 40 |
| MASTER GEAR NORM. CIRC. TOOTH THICKNESS | 2.3470 |
| TEST RADIUS | 12.837 ± 0.051 |
| CROWNING | 0.03 |

Fig.3c

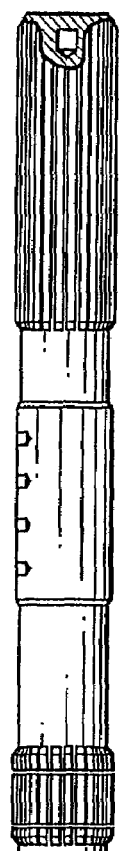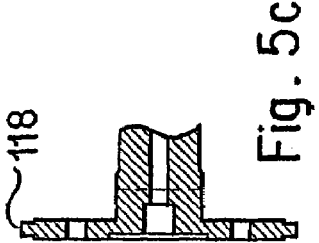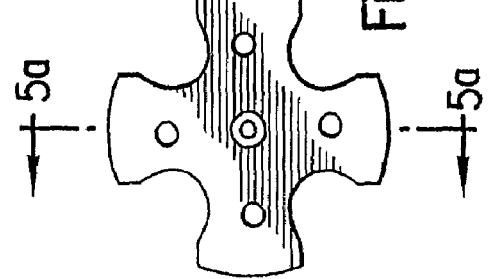

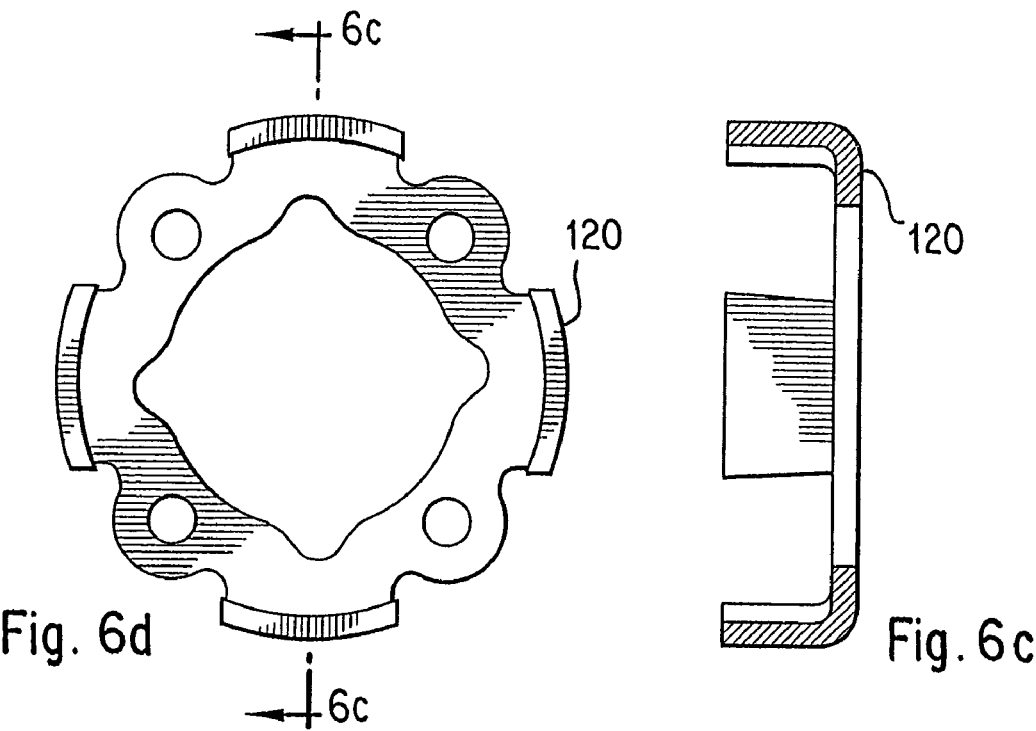
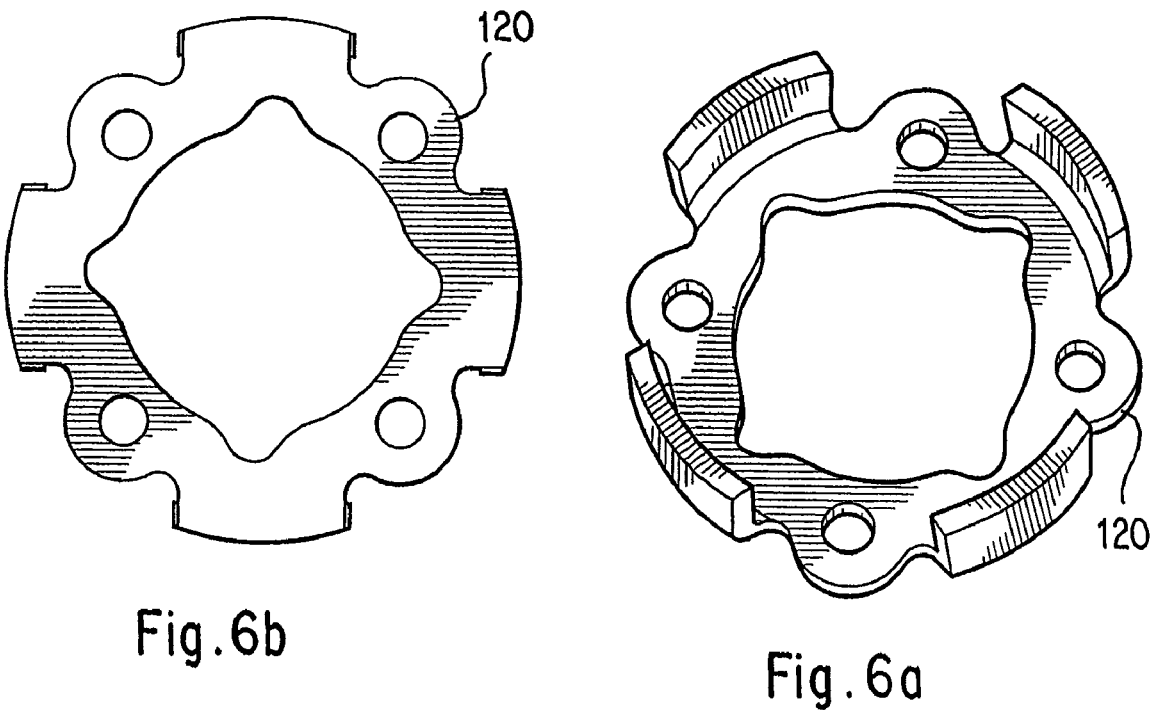

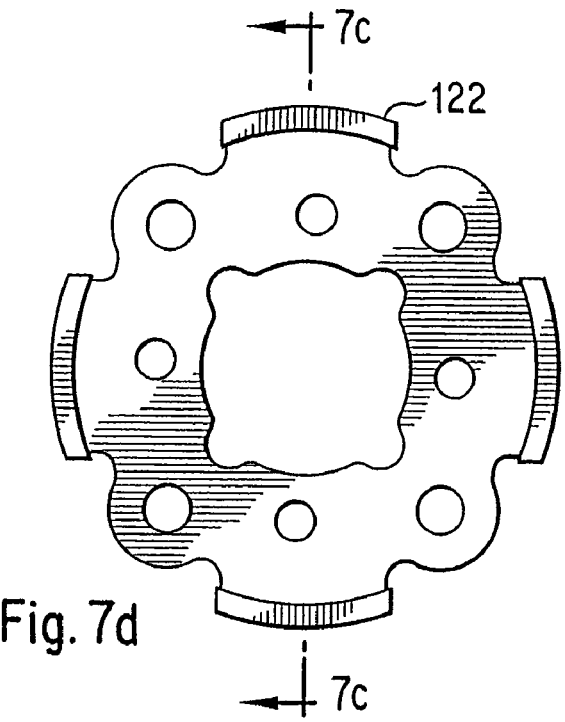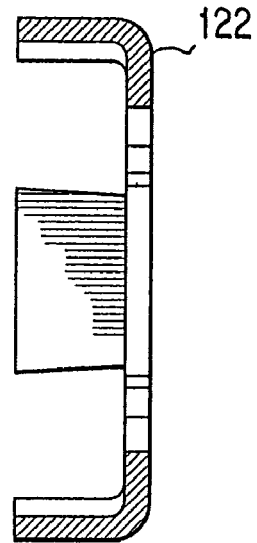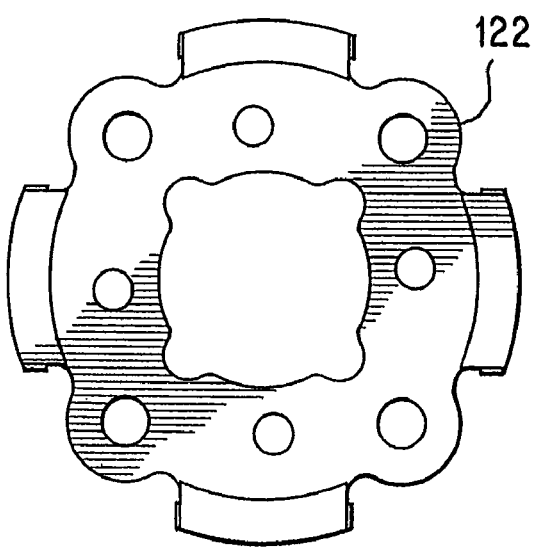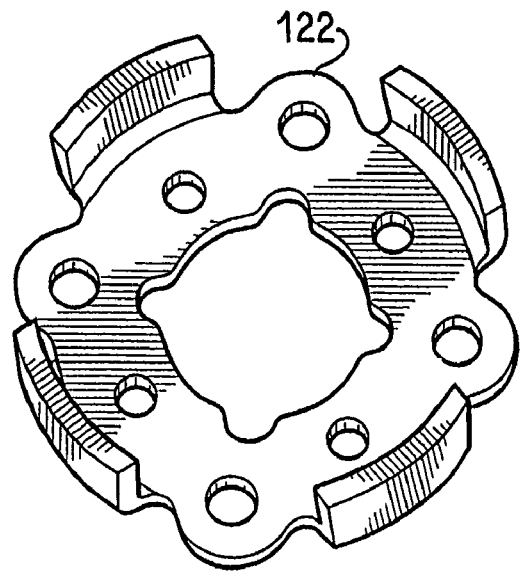
Fig. 7d
Fig. 7c
Fig. 7b
Fig. 7a

| EXTERNAL INVOLUTE SPLINE DATA ||
|---|---|
| NUMBER OF TEETH | 26 |
| NORMAL PRESSURE ANGLE | 18° |
| NORMAL DIAMETRAL PITCH | 17 |
| HELIX ANGLE | 18.08° |
| HAND | RIGHT |
| STANDARD PITCH DIAMETER | ⌀ 40.866 |
| MAJOR DIAMETER | ⌀ 45.60 ± 0.02 |
| MINOR DIAMETER | ⌀ 38.40 ± 0.05 |
| DIAMETER OF MEASURING PIN | ⌀ 3.0 |
| MEASUREMENT OVER 2 PINS | 46.844 ± 0.038 |
| NORMAL CIRCULAR TOOTH THICKNESS | 2.750 ± 0.018 |
| NORMAL TIP RADIUS | 0.25 |
| NORMAL FILLET RADIUS | FULL |
| TOTAL COMPOSITE TOLERANCE | 0.038 |
| TOOTH TO TOOTH TOLERANCE | 0.019 |
| MASTER GEAR NUMBER OF TEETH | 40 |
| MASTER GEAR NORM. CIRC. TOOTH THICKNESS | 2.3470 |
| TEST RADIUS | 21.386 ± 0.059 |
| CROWNING | 0.03 |

Fig. 8d

| GEAR DATA ||
|---|---|
| NUMBER OF TEETH | 12 |
| MODULE | 5.25 |
| PRESSURE ANGLE | 20° |
| HELIX ANGLE | SPUR |
| HAND | SPUR |
| TOOTH THICKNESS/ NUMBER OF TOOTH | W=41.6 ± 0.04/N=3 |
| MAJOR DIAMETER | ⌀ 70.45 ± 0.05 |
| MINOR DIAMETER | ⌀ 66.25 ± 0.05 |
| INTERNAL INVOLUTE SPLINE DATA ||
| NUMBER OF TEETH | 26 |
| DIAMETRAL PITCH | 17 |
| PRESSURE ANGLE | 18° |
| HELIX ANGLE | 18.08° |
| HAND | RIGHT |
| MAJOR DIAMETER | ⌀ 42.66 ± 0.05 |
| MINOR DIAMETER | ⌀ 38.65 ± 0.05 |
| PIN DIAMETER | ⌀ 2.8 |
| MEASUREMENT BETWEEN PINS | 37.65 ± 0.04 |

Fig. 9d

| EXTERNAL INVOLUTE SPLINE DATA ||
|---|---|
| NUMBER OF TEETH | 34 |
| NORMAL PRESSURE ANGLE | 18° |
| NORMAL DIAMETRAL PITCH | 17 |
| HELIX ANGLE | 18.08° |
| HAND | LEFT |
| STANDARD PITCH DIAMETER | ⌀ 53,44 |
| MAJOR DIAMETER | ⌀ 57.80 ± 0.02 |
| MINOR DIAMETER | ⌀ 50.20 ± 0.05 |
| DIAMETER OF MEASURING PIN | ⌀ 3.0 |
| MEASUREMENT OVER 2 PINS | 59.006 ± 0.042 |
| NORMAL CIRCULAR TOOTH THICKNESS | 2.520 ± 0.018 |
| NORMAL TIP RADIUS | 0.25 |
| NORMAL FILLET RADIUS | FULL |
| TOTAL COMPOSITE TOLERANCE | 0.038 |
| TOOTH TO TOOTH TOLERANCE | 0.019 |
| MASTER GEAR NUMBER OF TEETH | 40 |
| MASTER GEAR NORM. CIRC. TOOTH THICKNESS | 2.3470 |
| TEST RADIUS | 27.197 ± 0.067 |
| CROWNING | 0.03 |

Fig. 12d

| INNER GEAR DATA | |
|---|---|
| NUMBER OF TEETH | 34 |
| DIAMETRAL PITCH | 17 |
| PRESSURE ANGLE | 18° |
| HELIX ANGLE | 18.08° |
| HAND | LEFT |
| MAJOR DIAMETER | ⌀ 55.51 ± 0.05 |
| MINOR DIAMETER | ⌀ 51.25 ± 0.05 |
| PIN DIAMETER | ⌀ 2.8 |
| MEASUREMENT BETWEEN PINS | 49.04 ± 0.04 |

Fig.14d

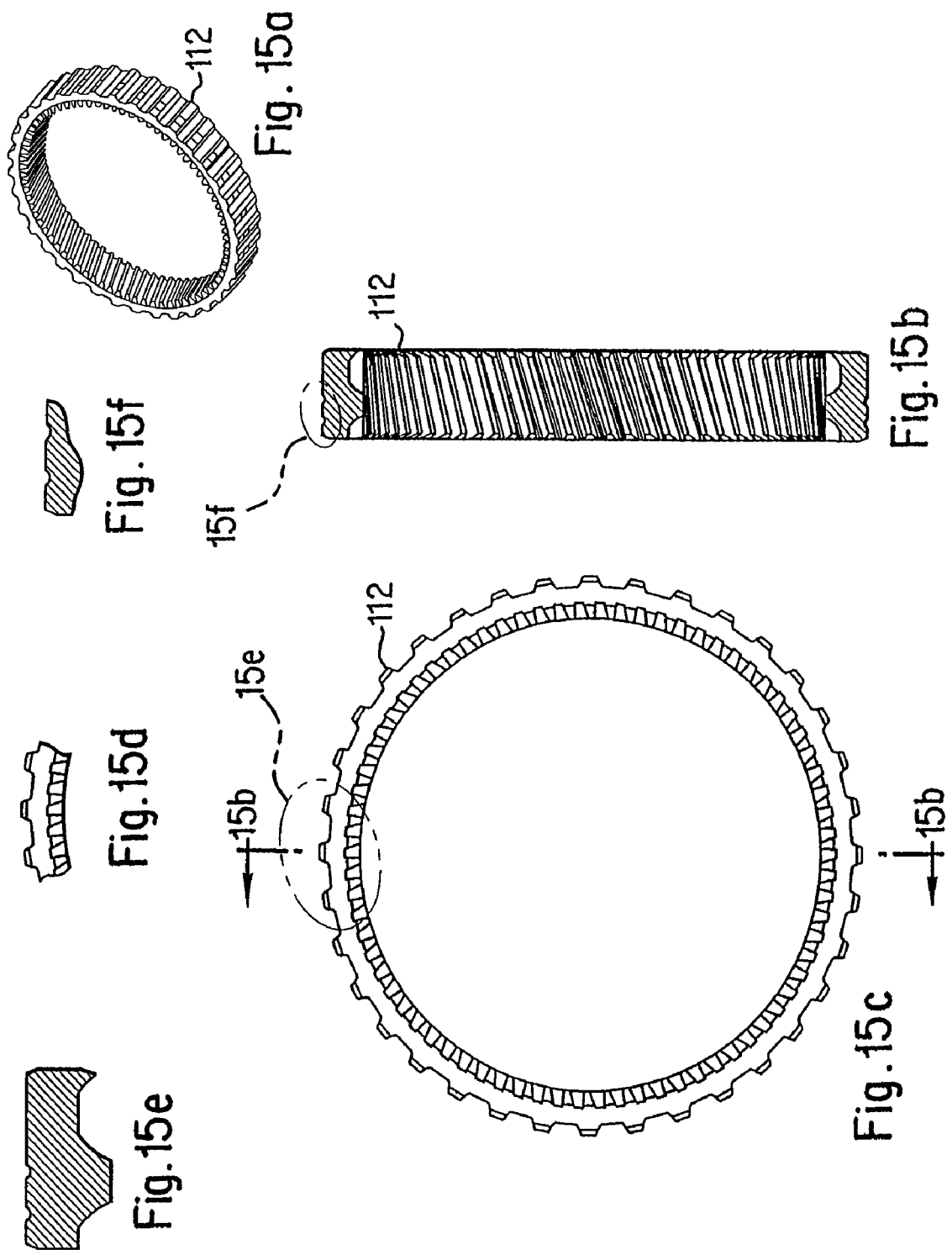

| EXTERNAL SPLINE DATA | |
|---|---|
| NUMBER OF TEETH | 36 |
| MODULE | 3.83245 |
| PRESSURE ANGLE | 24° 33' 36" |
| MAJOR DIAMETER | ⌀ 130.070 ± 0.10 |
| MINOR DIAMETER | ⌀ 132.92 ± 0.10 |
| INTERNAL GEAR DATA | |
| NUMBER OF TEETH | 14 |
| NORMAL DIAMETRAL PITCH | 17 |
| NORMAL PRESSURE ANGLE | 18 |
| HELIX ANGLE | 18.08° |
| HAND | RIGHT |
| STANDARD PITCH DIAMETER | ⌀ 116.310 |
| MAJOR DIAMETER | ⌀ 125.0 ± 0.25 |
| MINOR DIAMETER | ⌀ 116.99 ± 0.10 |
| DIAMETER OF MEASURING PIN | ⌀ 3.0 |
| MEASUREMENT OVER 2 PINS | 116.000 ± 0.038 |
| NORMAL CIRCULAR TOOTH THICKNESS | 0.778 ± 0.015 |
| NORMAL TIP RADIUS AT MAJOR DIAMETER | FULL |
| NORMAL FILLET RADIUS AT MINOR DIAMETER | 0.15 MAX |
| TOTAL COMPOSITE TOLERANCE | 0.177 ⬡ |
| TOOTH TO TOOTH TOLERANCE | 0.063 |

Fig. 15g

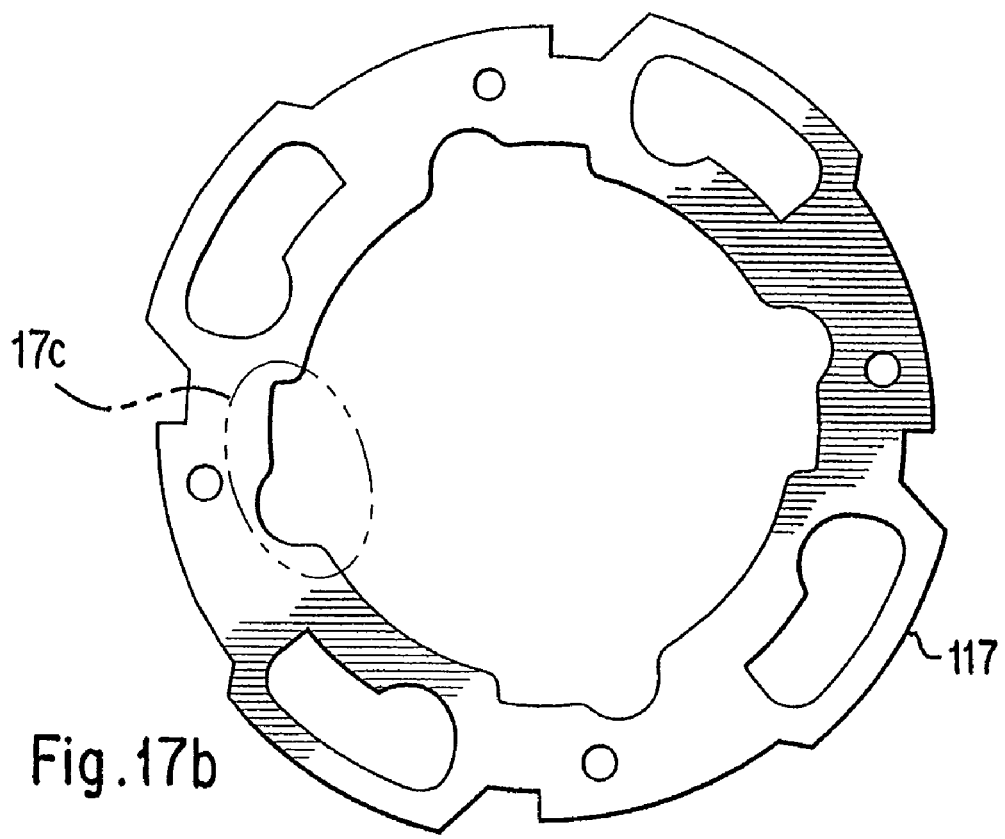
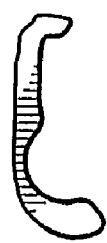
Fig. 17c
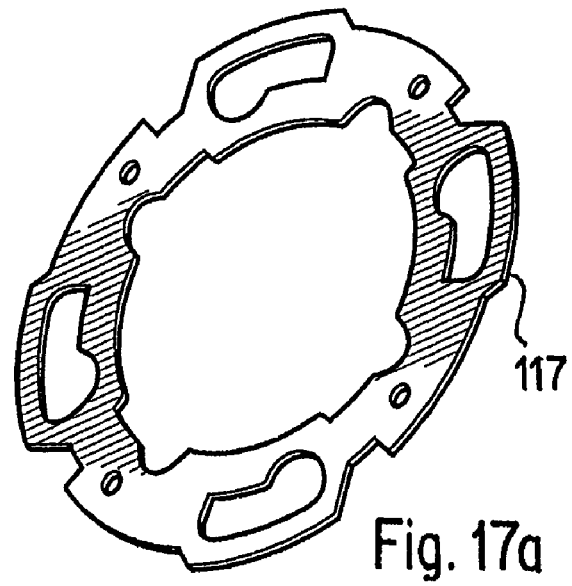

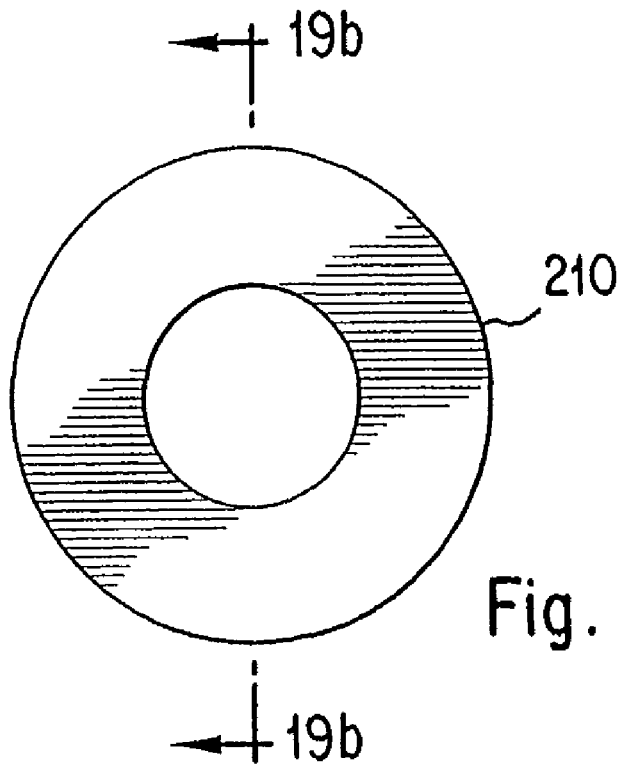
Fig. 19c
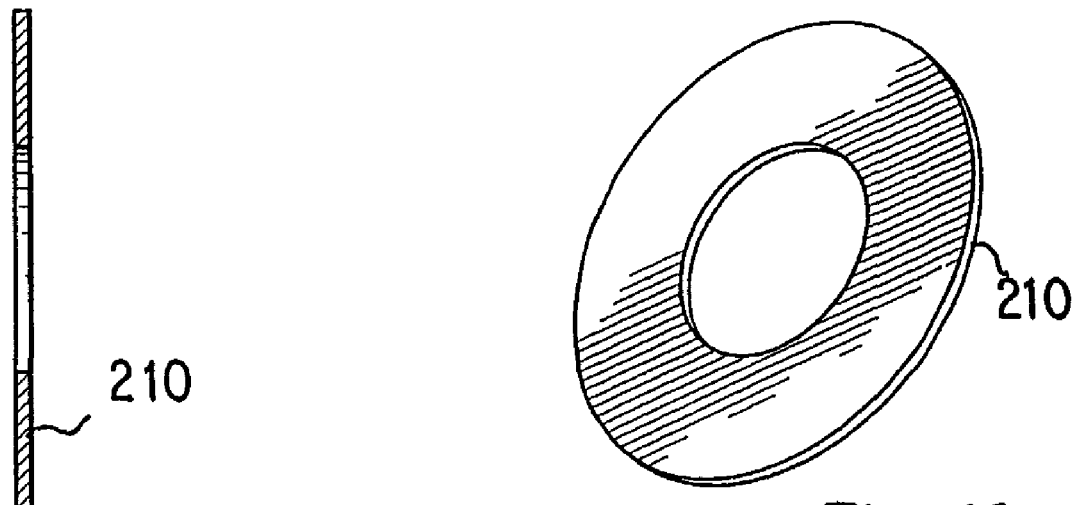
Fig. 19b
Fig. 19a

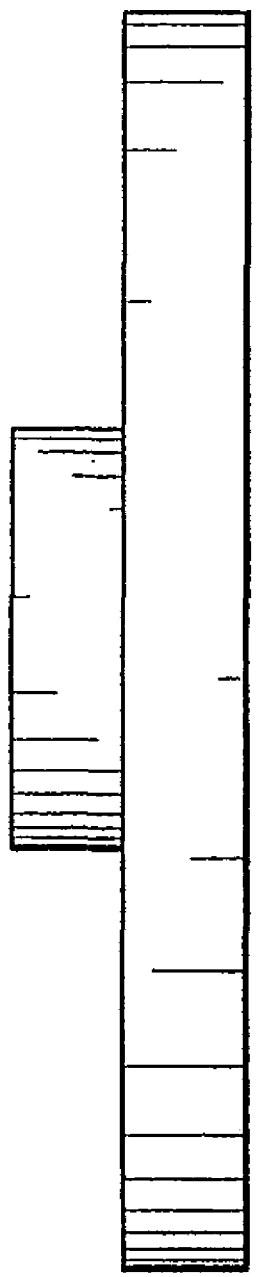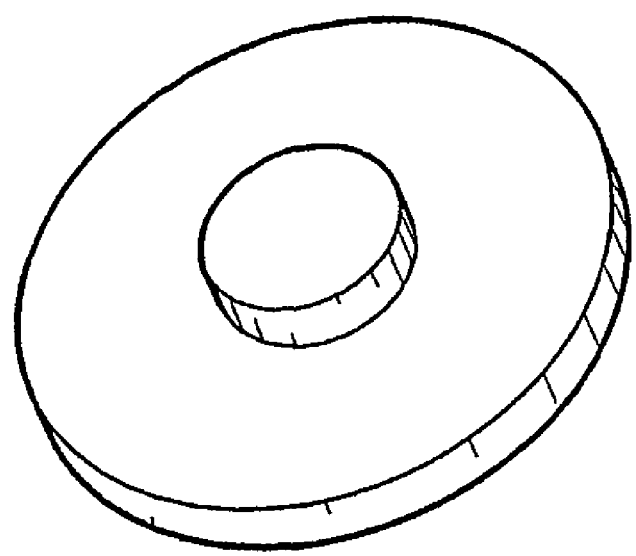
Fig. 23a
Fig. 23b

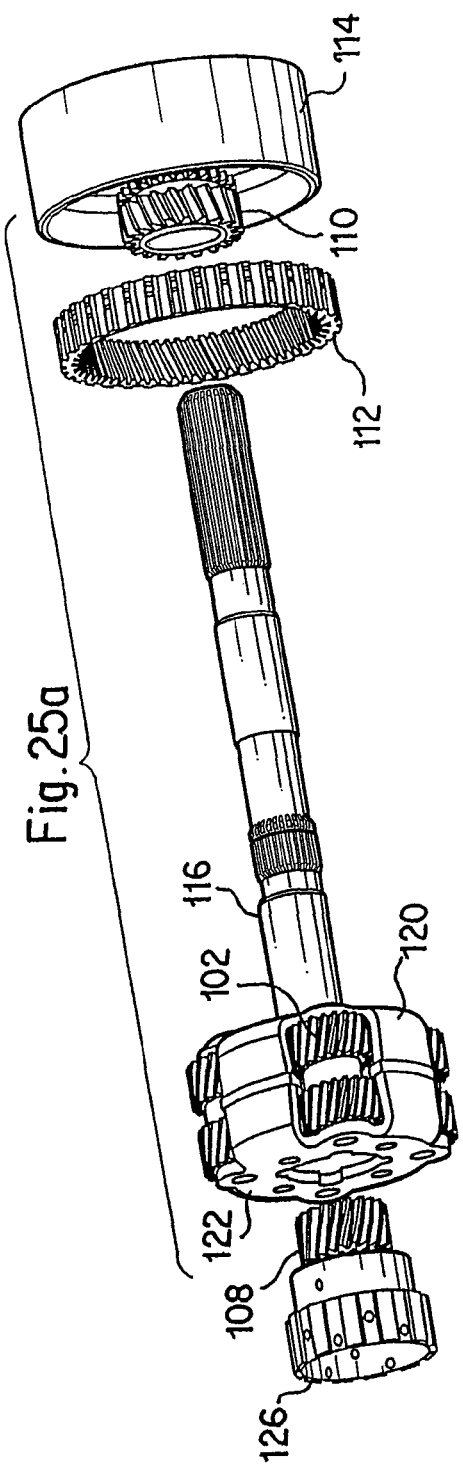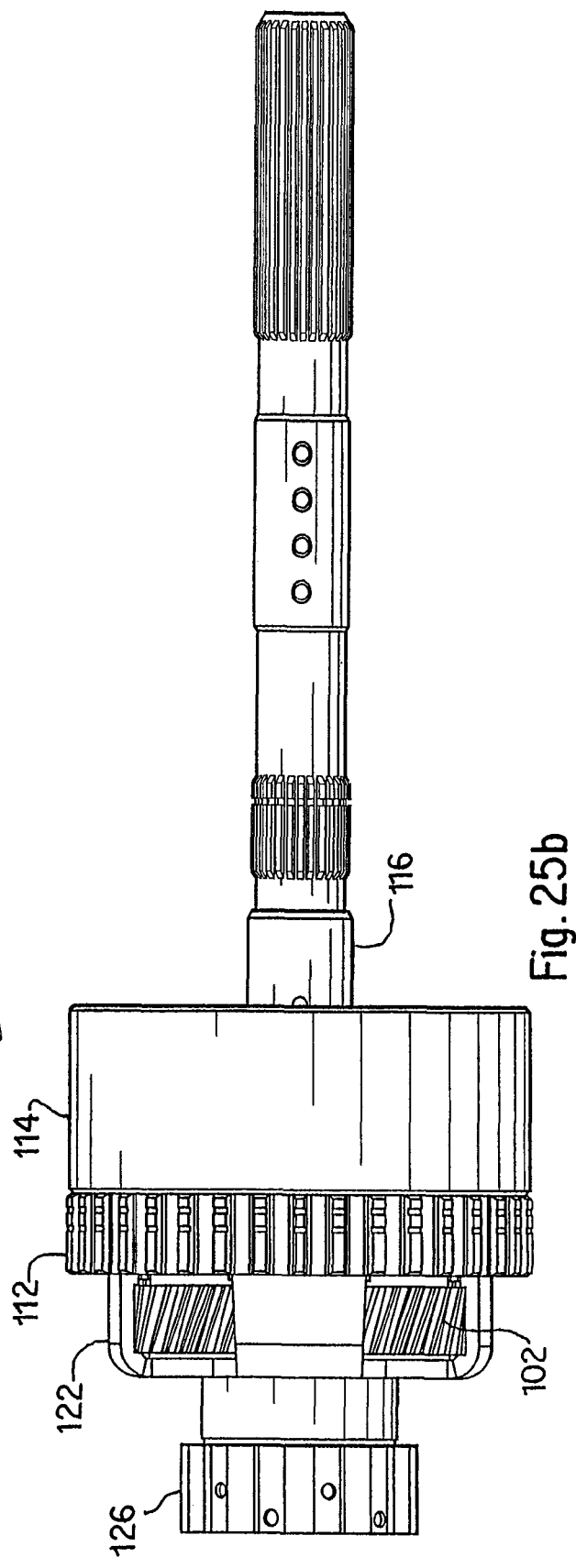

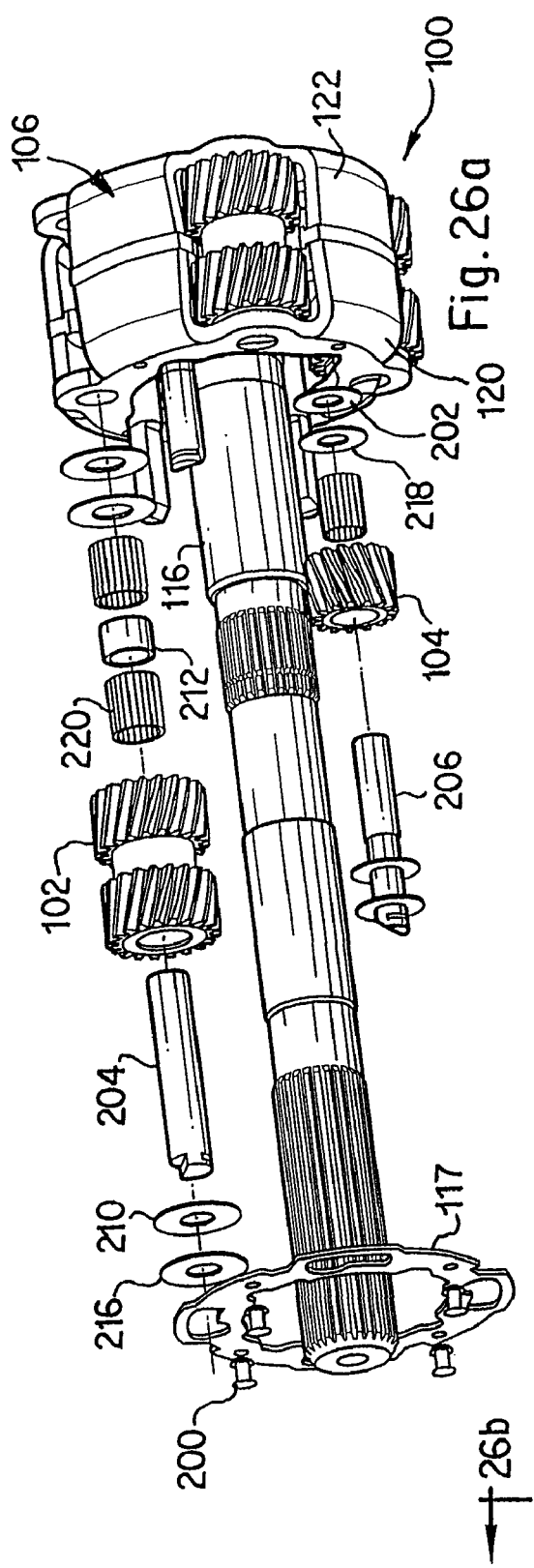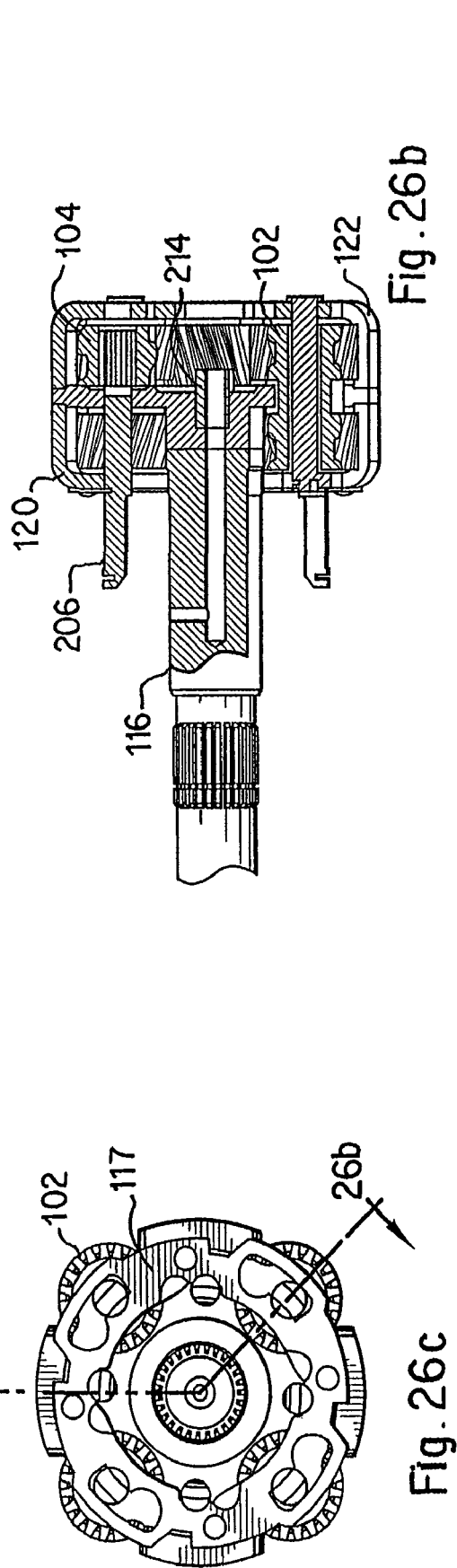
Fig. 26a
Fig. 26b
Fig. 26c

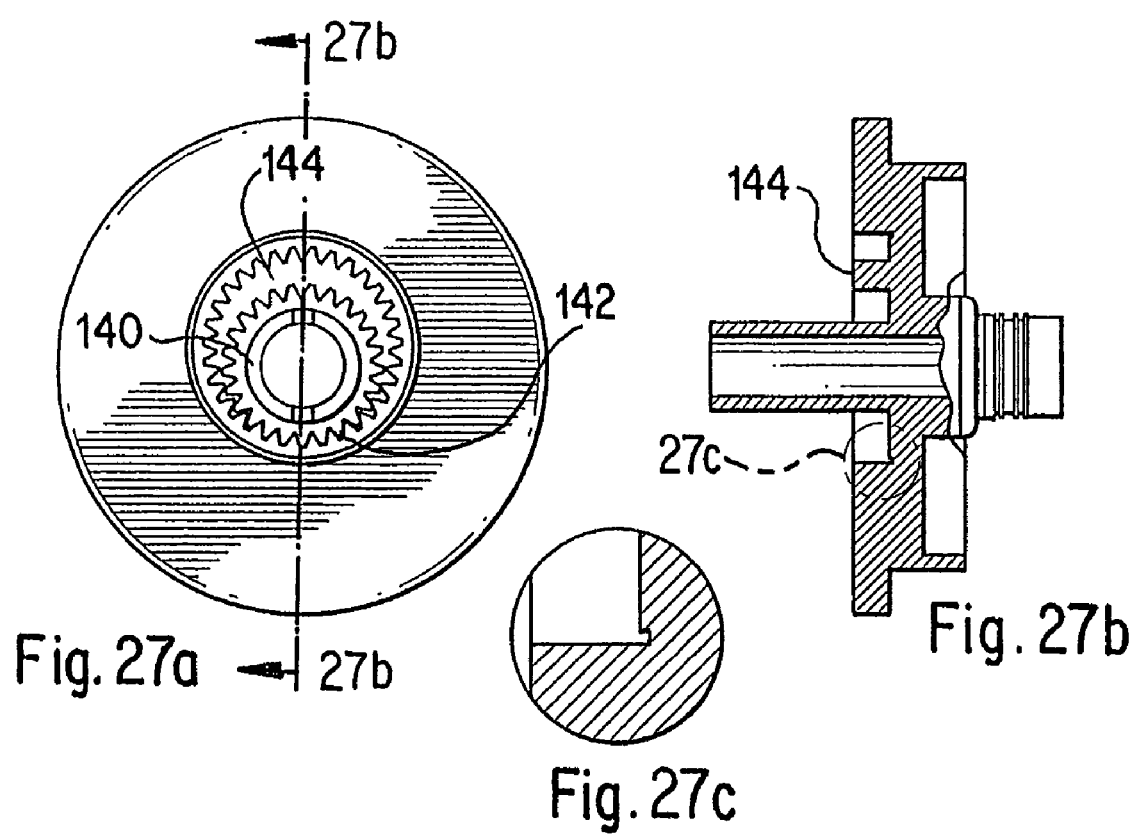

INTERNAL HELICAL GEAR
SPECIFICATION SHEETS

CUSTOMER
PART # AXIOM
PART DESCRIPTION 3112459400
 RING GEAR

| | NOMINAL | + TOL | − TOL | |
|---|---|---|---|---|
| # OF TEETH | 74 | | | |
| NORMAL MODULE | 1.500 | | | REF DIM |
| HELIX ANGLE (DEG.) | 18.08 | | | REF DIM |
| HAND | LEFT | | | |
| STANDARD PITCH DIAMETER (mm) | 116.765 | | | BASIC DIM |
| NORMAL PRESSURE (DEG) | 18 | | | REF DIM |
| NORMAL CIRCULAR TOOTH THICKNESS (mm) | 0.940 | 0.018 | 0.018 | |
| MAJOR DIAMETER (mm) | 125.305 | 0.250 | 0.250 | |
| MINOR DIAMETER (mm) | 117.309 | 0.020 | 0.020 | |
| NORMAL TIP-RADIUS AT MAJOR DIAMETER (mm) | FULL | | | |
| NORMAL FILLED RADIUS AT MINOR DIAMETER (mm) | 0.15 | | | MAXIMUM |
| MEASURING WIRE SIZE (mm) | 3.000 | | | BASIC DIM |
| DIMENSION OVER 2 WIRES (mm) | 116.105 | 0.048 | 0.048 | |
| TOTAL COMPOSITE TOLERANCE (mm) | 0.064 | | | |
| TOOTH TO TOOTH TOLERANCE (mm) | 0.023 | | | |

OTHER REFERENCE INFORMATION − NOT PART OF DRAWING

| | | | | |
|---|---|---|---|---|
| DESIGN CENTER DISTANCE (mm) | 43.685 | 0.030 | 0.030 | |

FIG.31

EXTERNAL HELICAL GEAR SPECIFICATION SHEETS

| | AXIOM 41124612010 FRONT SUN GEAR | | | AXIOM 41124584030 PINION GEAR (SHORT) | | | AXIOM 41124584020 PINION GEAR (LONG) | | | AXIOM 41124557030 SUN GEAR FINISHED | | |
|---|---|---|---|---|---|---|---|---|---|---|---|---|
| CUSTOMER | | | | | | | | | | | | |
| PART # | | | | | | | | | | | | |
| PART DESCRIPTION | NOMINAL | +TOL | −TOL | NOMINAL | +TOL | −TOL | NOMINAL | +TOL | −TOL | NOMINAL | +TOL | −TOL |
| # OF TEETH | 26 | – | – | 15 | – | – | 20 | – | – | 34 | – | – |
| NORMAL MODULE | 1.500 | REF DIM | REF DIM | 1.500 | REF DIM | REF DIM | 1.500 | REF DIM | REF DIM | 1.500 | REF DIM | REF DIM |
| HELIX ANGLE (DEG.) | 18.08 | REF DIM | REF DIM | 18.08 | REF DIM | REF DIM | 18.08 | REF DIM | REF DIM | 18.08 | REF DIM | REF DIM |
| HAND | RIGHT | | | LEFT | | | RIGHT | | | LEFT | | |
| STANDARD PITCH DIAMETER (mm) | 41.026 | BASIC DIM | BASIC DIM | 23.669 | BASIC DIM | BASIC DIM | 31.558 | BASIC DIM | BASIC DIM | 53.649 | BASIC DIM | BASIC DIM |
| NORMAL PRESSURE ANGLE (DEG) | 18 | REF DIM | REF DIM | 18 | REF DIM | REF DIM | 18 | REF DIM | REF DIM | 18 | REF DIM | REF DIM |
| NORMAL CIRCULAR TOOTH THICKNESS (mm) | 2.700 | 0.018 | 0.018 | 2.800 | 0.018 | 0.018 | 2.860 | 0.018 | 0.018 | 2.439 | 0.018 | 0.018 |
| OUTSIDE DIAMETER (mm) | 45.600 | 0.020 | 0.020 | 28.400 | 0.020 | 0.020 | 36.500 | 0.020 | 0.020 | 57.700 | 0.020 | 0.020 |
| ROOT DIAMETER (mm) | 38.400 | 0.050 | 0.050 | 21.100 | 0.050 | 0.050 | 28.900 | 0.050 | 0.050 | 50.300 | 0.050 | 0.050 |
| NORMAL TIP RADIUS (mm) | 0.250 | | | 0.250 | | | 0.250 | | | 0.250 | | |
| NORMAL FILLET RADIUS (mm) | FULL | | | FULL | | | FULL | | | FULL | | |
| MEASURING WIRE SIZE (mm) | 3.000 | BASIC DIM | BASIC DIM | 3.000 | BASIC DIM | BASIC DIM | 3.000 | BASIC DIM | BASIC DIM | 3.000 | BASIC DIM | BASIC DIM |
| DIMENSION OVER 2 WIRES (mm) | 46.860 | 0.038 | 0.038 | 29.297 | 0.034 | 0.034 | 37.606 | 0.035 | 0.035 | 58.983 | 0.043 | 0.043 |
| TOTAL COMPOSITE TOLERANCE (mm) | 0.038 | | | 0.038 | | | 0.038 | | | 0.038 | | |
| TOOTH TO TOOTH TOLERANCE (mm) | 0.019 | | | 0.019 | | | 0.019 | | | 0.019 | | |
| MASTER GEAR # OF TEETH | 40.000 | | | 40.000 | | | 40.000 | | | 40.000 | | |
| MASTER GEAR NORM. CIRC. TOOTH THICKNESS (mm) | 2.3562 | | | 2.3562 | | | 2.3562 | | | 2.3562 | | |
| TEST RADIUS | 21.333 | 0.060 | 0.060 | 12.704 | 0.052 | 0.052 | 16.847 | 0.054 | 0.054 | 27.056 | 0.069 | 0.069 |

OTHER REFERENCE INFORMATION – NOT PART OF DRAWING

| | | | | |
|---|---|---|---|---|
| DESIGN CENTER DISTANCE (mm) | 33.650 0.030 | 29.079 0.030 | 43.685 0.030 | 0.030 |

FIG.32

AUTOMATIC TRANSMISSION AND GEAR TRAIN

This application is a continuation of U.S. patent application Ser. No. 11/002,639, filed Dec. 3, 2004, the entire disclosure of which is incorporated herein by reference, which, in turn, claims priority under 35 U.S.C. § 119(e) to prior U.S. provisional application Ser. Nos. 60/526,978 and 60/526,979, both filed Dec. 5, 2003.

CROSS-REFERENCE TO RELATED APPLICATION

Cross-reference is hereby made to commonly assigned, co-pending related U.S. patent application Ser. No. 11/002,635, filed Dec. 3, 2004.

BACKGROUND OF THE INVENTION

1. Field of the Invention

The present invention relates to automatic transmissions and gear trains. In particular, the instant invention relates to an automatic transmission and gear train with improved resistance to deterioration with an increased effective life.

2. Description of Related Art

Motorized vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range can be repeated. Early automatic transmissions had two speed ranges. This severely limited the overall speed range of the vehicle and therefore required a relatively large engine that could produce a wide speed and torque range. This resulted in increased engine wear and tear and reduced engine efficiency. As a result, manually-shifted transmissions that offered several speed ratios were the most popular for use in motor vehicles.

With the advent of three- and four-speed automatic transmissions, the automatic shifting (planetary gear) transmission increased in popularity. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

One aspect of the instant invention is a redesign of an automatic transmission that has a high failure rate in its present application. The U.S. Postal Service (USPS) fleet has 160,000 Long Life Vehicles (LLV's) on the road with a service life of 25 or more years. These vehicles rely on the 180C and/or the 700R4 transmission. There has been a long felt need to design a total transmission system specifically for the vehicle driving conditions of this fleet that would provide durability, longevity and cost savings in the field. High vehicle down time due to inherent original transmission design problems have been plaguing this fleet for many years. During this time, the USPS has utilized local and regional rebuilders to supply replacement products to keep their fleet on the road at great cost.

Due to a shortage of quality replacement parts for the 180C transmission, a 700R4 transmission was introduced in the late '90's to replace the 180C. The 700R4 transmission is a GM unit that has been in the marketplace for many years. This unit was not designed for the Postal LLV application and had to be modified to adapt to the vehicle. This kit included a driveshaft, shift linkage and torque converter. The lack of controlled testing and evaluation of the 700R4 transmission resulted high failure rates in the field. Thus, there is a clear need for a transmission that is an improvement over the 180C and 700R4 transmissions.

The 180C transmission has problems in five areas:
1. Planetary gear wear or tooth breakage.
2. Valve body malfunction. (2-3 shift valve sleeve sticks)
3. Torque converter fails.
4. Main pump fails.
5. Low band fails.

The nature of the use of the 180C transmission by the Postal Service results in constant shifting from first gear to second gear and back down to first gear. This shifting sequence occurs hundreds of times per vehicle in one day of service. The 180C transmission was designed to shift first to second and then to third. The converter clutch would then be applied and the driver and vehicle would proceed to its destination. Thus, most of the transmission's useful service would be spent in third gear. The 180C transmission as used by the Postal Service, and in other applications which require a great deal of stop and go driving, does not see such ideal usage. After repeated first to second and then second to first shifts the pinion gears within the 180C gear train begin to spall. The spalling of the gears results in very small yet very hard pieces of steel flaking off the pressure angle surface of each pinion gear. These pieces of steel are washed away from the pinion gears by the oil that lubricates and cools these same gears; thus the pieces of hard steel are suspended in the oil. As the contaminated oil is pumped to all critical areas of the transmission, these pieces of metal act as an abrasive to all parts they contact. The abrasive action of the steel particles wears the surfaces of all mating and moving parts. As gear deterioration progresses the hard steel particles become more concentrated in the oil and become lodged in the valves of the valve body. This results in the transmission not shifting back to first gear, but instead using second as the lowest gear. This phenomenon was confirmed in transmission destructive tests. In order to continue the test, the valve body had to be replaced for the transmission to operate in a normal manner.

Other affected parts are the torque converter and the main pump assembly. It is difficult to determine which of these assemblies fail first since they are connected and the contaminated oil is pumped from one to the other. Observed deterioration includes the converter hub wearing where it is supported by the pump bushing, converter internal bearing deterioration, pump outer and inner gear wear, and pressure regulator valve malfunction. All of these malfunctions are the direct result of the suspended metal in the oil.

This deterioration can lead to main pump malfunction and oil loss between the converter hub and the pump. The loss of shifting control and pump pressure results in the rise of transmission temperature, with temperatures of three hundred degrees or more conceivable. Under these conditions the seals that hold the oil pressure that applies the clutches and bands begin to harden and allow for oil leakage, thus also allowing the clutches and band to slip under load, which leads eventually to clutch and band failure. At this point complete transmission failure occurs. The vehicle will not move.

The conventional planetary gear system in the 180C transmission includes a sun gear and a ring gear with pinion gears engaged between the sun and ring gears. The pinion gears are connected to and carried by a pinion carrier assembly. The pinion carrier assembly includes a pinion carrier body and pinion shafts, the pinion shafts being fixed to the pinion carrier body. The 180C utilizes a three-pinion arrangement of compound and plain gears (six gears total, three compound and three plain). As stated above, this transmission fails because of the nature of the application. The repeated shifts between first and second gear causes spalling of the pinion gears. The solution to the above described problems is to prevent this spalling. The instant invention comprises a system that would substantially extend the life of the average 180C transmission. This newly rebuilt transmission is the 280PS™ transmission.

SUMMARY OF THE INVENTION

One embodiment of the instant invention contemplates a unique transmission gear train.

Another embodiment of the instant invention contemplates an eight gear compound planetary gear train with the accompanying front sun gear, rear sun gear and ring gear of the appropriate and unique size.

A further embodiment of the instant invention contemplates a complete transmission system that will perform at least about thirty three percent longer than current design or more.

Another embodiment of the instant invention contemplates a 4 compound pinion gear train.

An additional embodiment of the instant invention contemplates a complete transmission system having eight pinion gears, four of which are compound, four of which are single.

An additional embodiment of the instant invention contemplates a transmission which is at least about 3 decibels quieter than current transmissions.

BRIEF DESCRIPTION OF THE FIGURES

For a fuller understanding of the nature and desired objects of the present invention, reference is made to the following detailed description taken in conjunction with the accompanying figures wherein:

FIGS. 5a-5c illustrate an output shaft with flange, with FIG. 5a showing the shaft and flange partly in cross section, FIG. 5b showing the flange from one end, and FIG. 5c showing the shaft and flange in cross section after the flange has been machined.

FIGS. 6a-6d are various views of a top shell of a carrier.

FIGS. 7a-7d are various views of a lower shell of the carrier.

FIGS. 8a-8d are various views and parameters of a front sun gear.

FIGS. 9a-9d are various views and parameters of a front sun gear hub.

FIGS. 14a-14d illustrate a rear band drum and its parameters.

FIGS. 15a-15g illustrate a ring gear and its parameters.

FIGS. 17a-17c illustrate a lock plate.

FIGS. 19a-19c illustrate a large washer.

FIG. 23 illustrates an output flange casting.

FIG. 25 illustrates a complete assembly.

FIG. 26 illustrates a complete planetary gear kit.

FIG. 27 illustrates the 280 transmission pump.

FIG. 31 illustrates the specifications of the internal helical gear.

FIG. 32 illustrates the specifications of the external helical gear.

DETAILED DESCRIPTION OF THE INVENTION

Figure 1A:
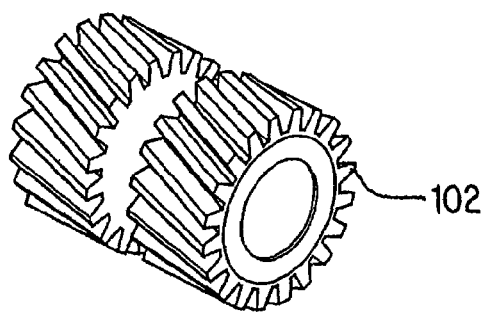
FIGS. 1a-1b illustrate a compound pinion gear, with FIG. 1a showing the gear in perspective, FIG. 1b showing the gear in cross section, and FIG. 1c showing parameters.

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implicated in other compositions and methods, and that any such variation would be within such modifications that do not part from the scope of the present invention. Before explaining the disclosed embodiments of the present invention in detail, it is to be understood that the invention is not limited in its application to the details of any particular embodiment shown, since of course the invention is capable of other embodiments. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

The current state of the art, the 180C transmission, utilizes a six pinion compound planetary gear train. The instant invention is directed to an eight gear compound planetary gear train with the accompanying front sun gear, rear sun gear and ring gear of the appropriate and unique size.

Regardless of what engine is used in front of any transmission the total torque produced by that engine must be transferred to the ground by the transmission and associated parts. Each pinion gear transfers its share of the torque. Thus, if you had three pinion gears in the carrier each pinion would transfer thirty three percent of the torque generated at any one time. If a fourth pinion gear is added to the carrier the amount of torque transferred by each gear is reduced to twenty five percent. The importance of this change reveals itself in the affective life of the four pinion gears collectively. By reducing the load each gear must transfer you increase the number of times the gear can transfer the load. In the case of the transmission in accordance with the instant invention the affective life of the gear train is increased by thirty three percent and the beginning of gear spalling is delayed by the same amount of time. One can then conclude that all other parts that make up the transmission and are cooled and lubricated by the same oil would experience a similar increase in effective performance. The longer the system is kept free of harmful contamination the longer the system will properly function.

Through an extensive process of root cause analysis, five areas of deficiency were identified within the 180C transmission; deficiencies in the inner diameter of the hydraulic pump, one deficiency in the alignment of the bell housing, one deficiency was found in the low servo apply circuit, one deficiency was detected in the 2/3 shift valve in the valve body, and one deficiency was found in the low rear band. These areas of deficiency are listed below and are addressed in the subsequent like number sections.

1. The outer pump gear moves out of alignment with the inner pump gear. (metal generated by the pump)

2. The inner gear contacts the inner diameter of the pump crescent. (noise is created)

3. The oil pressure developed by the pump is not consistent.

4. The amount of oil delivered to the transmission lube circuit and torque converter feed circuit is not consistent. (not enough oil to reliably cool and lubricate the gear train and not enough oil to cool and lubricate the torque converter under all conditions)

5. The bushing bore center of the bell housing that aligns the torque converter and the transmission pump assembly is out of alignment.

6. The aluminum two to three (2/3) shift valve sleeve wears resulting in erratic and unpredictable operation of the 2/3 shift valve.

7. The low band does not hold the rear band drum and sun-gear under all conditions.

1. Metal Generated by the Transmission Pump. (Outer Gear Moves out of Alignment with the Inner Gear.)

Figure 29A:
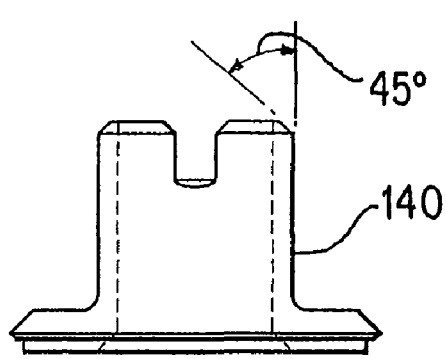
FIG. 29 illustrates the 280PS flanged converter hub.
Figure 29B:
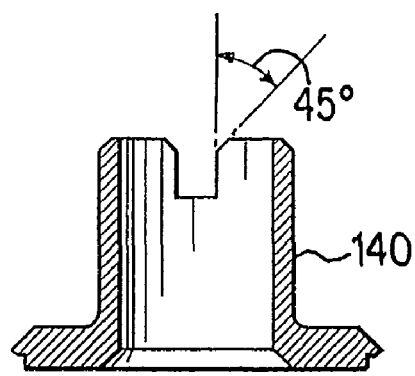
Figure 29C:
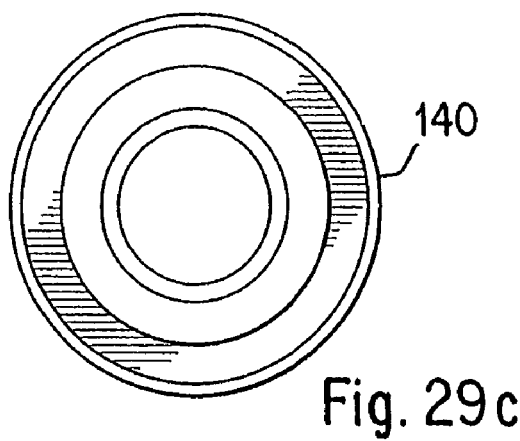

Metal particles are generated by the rotary motion of the inner and outer gear that creates the volume of oil that results in the necessary oil pressure to operate and sustain the transmission. In order to prevent the creation of metal particles from the oil pump, the inner and outer gear must be kept in their proper position so the motion of the outer gear does not improperly mesh with the inner gear. The inner gear is held in place by the converter hub 140 (FIGS. 29a-29c) and the converter hub bushing that is located in the bell housing. If either of these parts are not straight (greater than 0.002" TIR) the inner gear will cause a problem. The problem of inner gear support is discussed as part of the proper remanufacture of the torque converter and the bell housing that follows. The support of the outer gear is another problem. The natural action of the two gears is to move away from one another in the area of the pressure port. Thus, the outer gear has a tendency to move to the left and the inner gear moves to the right. The outer and inner gears are constructed of powder metal and the pump housing is constructed of iron. The outer diameter of the outer gear is in constant contact with the pump housing. Over time, the outer diameter of the outer pump gear begins to wear into the pump housing. This action creates metal particles in much the same manner as the pinion gears. In order to prevent this, the pump used in the 280PS™ transmission system has a SAE 660 bronze sleeve inserted in the housing in the area of the outer gear. The bronze sleeve is machined to the proper clearance for the outer gear and forms a perfect wear surface that will assure long and sustained performance.

2. Noise Created by Inner Gear Contacting Inner Diameter of Pump Crescent.

Referring to FIGS. 27a-27c, the tips of the inner pump gear teeth 142 contact the leading edge of the inner diameter of the pump crescent as the bell housing bushing wears. When this undesirable interference occurs between inner pump gear teeth and the pump crescent, noise and small metal particles are generated. The noise is unacceptable from an operational perspective and the metal that is generated as a result of the interference is detrimental to the longevity of the transmission. Both of the above mentioned problems are eliminated by modifying the geometry of the inner pump crescent. The pump of the transmission of the instant invention has the pump crescent inner diameter changed to remove the noise and eliminates the creation of metal particles generated by the inner pump gear contacting the crescent inner diameter. The new geometry of the inner crescent creates 0.060" clearance between the inner gear and the leading edge of the inner pump crescent (initial point of contact) and decreases to 0.000" in a consistent arc 60 to 65 degrees from the initial point of generation. In so doing the tips of the teeth 142 of the inner gear can not contact the leading edge of the inner pump crescent yet by design will still contain the oil within the inner pump crescent which maintains all the previous oil pumping capacity that the pump was designed to create. This new design thus eliminates both the noise and the generation of metal particles, contributing to the overall longevity of the transmission.

3. Inconsistent Oil Pressure.

The oil pressure generated by the pump is regulated by the pressure regulator valve which is preloaded by the pressure regulator spring. The combination of these two parts working in conjunction with the vacuum modulator (which senses engine load) and the transmission governor (which senses vehicle speed) creates the appropriate oil pressure required to hold all clutches from slipping and produce oil to lubricate and cool the total transmission during operation. The USPS's unique application of this transmission requires the lubrication oil to be regulated in the first and second gear ranges, where it spends most of its operating life, in such a way as to supply oil to lubricate the gear train and prevent the deterioration of meshing components. It was observed during root cause analysis that lubrication oil pressures varied greatly in the transmission. The cause was determined to be the pressure regulator spring creating significantly different preload pressures on the pressure regulating valve. This resulted in either a surplus of lubrication oil or a deficiency of lubrication oil. The new design pressure regulator spring incorporated in the 280PS™ pump uniformly preloads the pressure regulator valve thus assuring correct and uniform oil pressure which maintains correct clutch pressure and lubrication oil flow.

4. Inconsistent Lubrication Oil Flow to the Gear Train and Torque Converter.

It was observed through root cause analysis that even with consistent pressure regulation of the transmission oil pump that under certain extreme conditions the oil supplied to the transmission gear train and the torque converter was severely reduced or cut off completely. Both of these conditions created high wear conditions which reduced the life of the transmission. In order to prevent the reduction or loss of lubrication oil, a new method of supplying oil to the critical lubrication circuit had to be created that would supply lubrication oil to the transmission under any condition. This problem was solved by re-engineering the oil lubrication circuit to allow a constant flow of oil from the pressure port to the lubrication port without the influence of the pressure regulation system. A passage (equal to 0.040") was created between the pressure port of the pump, before regulation, and the lubrication circuit. In so doing, lubrication oil was assured under all conditions guaranteeing adequate lubrication and cooling to critical components and thus extending the life of the transmission.

5. New Bell Housing Design.

Figure 28:
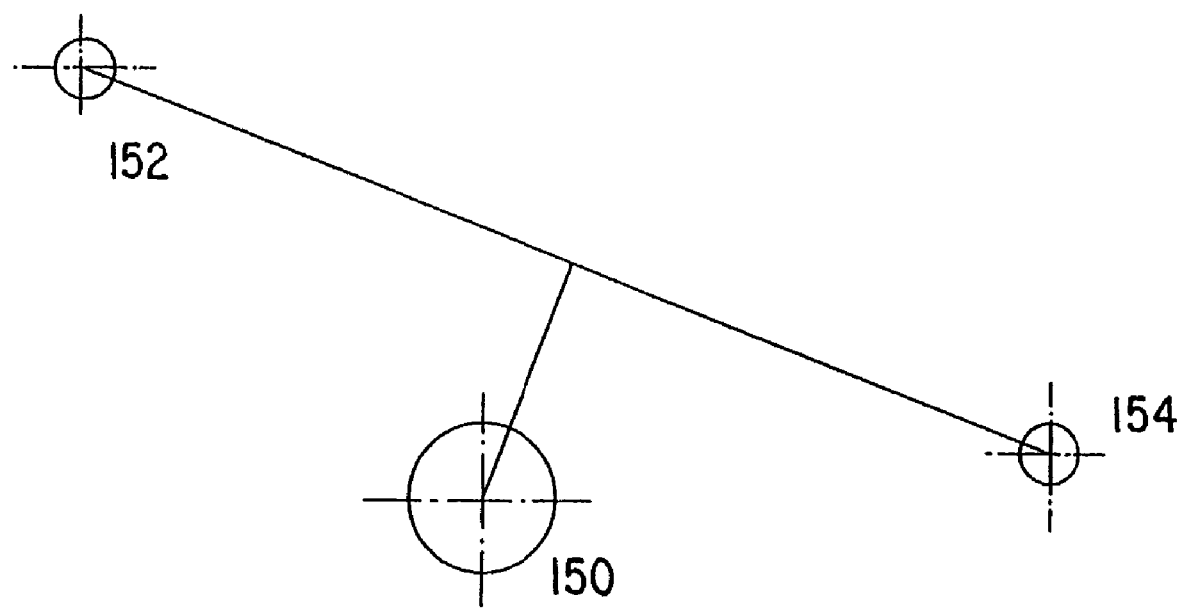
FIG. 28 illustrates the 280 bell housing geometry.

It was observed through root cause analysis that the inner gear of the transmission pump would move, over time, due to the wear of the bell housing bushing. The wear of the bushing allowed the converter hub and the inner pump gear to move in the direction of the leading edge of the pump crescent and thus create noise and metal to metal contact. In order to reduce the possibility of such an occurrence, the center of the bell housing bushing was moved in the opposite direction and in the same distance of the measured wear. Referring to FIG. 28, the new position of the bell housing bushing center 150 is a function of the distance off center in relation to the alignment dowels, schematically designated 152, 154, located on the bell housing which are used to align the entire transmission to the engine. During transmission operation the pressure created within the transmission oil pump pushes the inner gear and the converter hub off center by the amount of clearance that exists between the converter hub and the bell housing bushing, minus the oil film created between the two. When this misalignment occurs, all the corresponding parts that depended on the alignment of the bell housing bushing experienced misalignment by the same amount (0.002" to 0.005"). The bell housing bushing bore should be on center with the crankshaft center which is correspondingly on center with the transmission pump inner gear. When the pressure created inside the pump is exerted on the inner gear and the torque converter hub, the center line of these parts is forced off center during operation. When normal wear was added to this equation the misalignment was magnified adding to premature transmission failure. The new bell housing design moves the center line of the bell housing bushing 0.0025" off center in the opposite direction of pressure, thus when the pump pressure is exerted on the pump gear and converter hub the entire assembly of associated parts achieves alignment during operation.

This new alignment design removes the accumulative misalignment that previously existed between the tolerance fits required between the converter hub and the inner pump gear, the tolerance fit required between the pump stator shaft spline and the torque converter stator sprag race, the tolerance fit required between the transmission input shaft spline and the torque converter turbine spline and the tolerance fit required between torque converter nose pilot and the engine crankshaft torque converter pilot hole. This new design achieves operational alignment which reduces the wear on all affected components, thus reducing metal particle generation to the greatest extent possible and extending transmission life of the 280PS™.

6. Valve Body (2/3 Shift Valve and Sleeve Combination)

Figure 30:
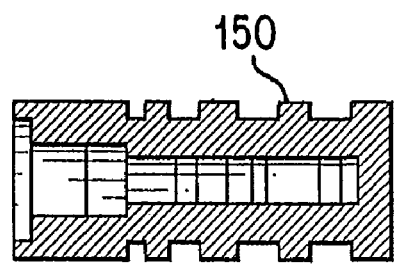
FIG. 30 illustrates the 280 2/3 shift valve.
Figure 33:
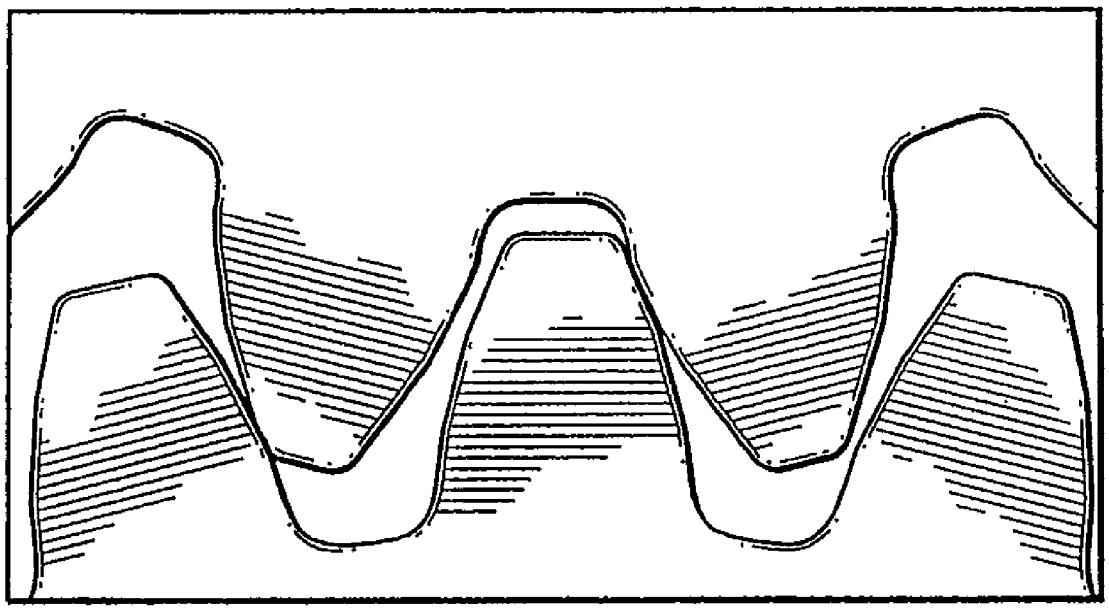
FIG. 33 illustrates a virtual gear mesh representation of the initial 15T to 26T design.
Figure 34:
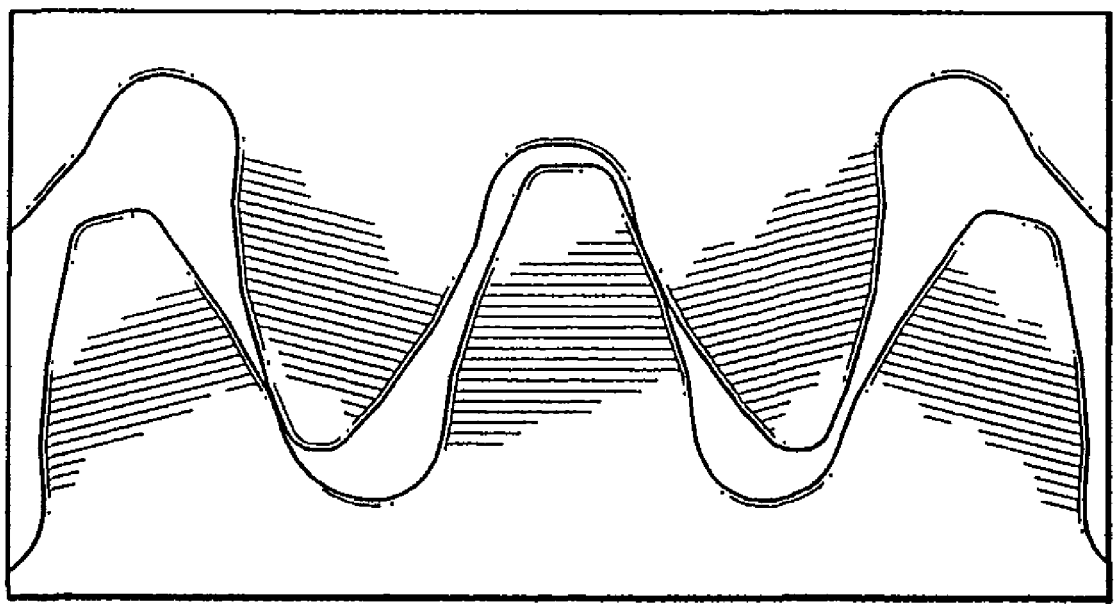
FIG. 34 illustrates a virtual gear mesh representation of the revised 15T to 26T design.
Figure 35:
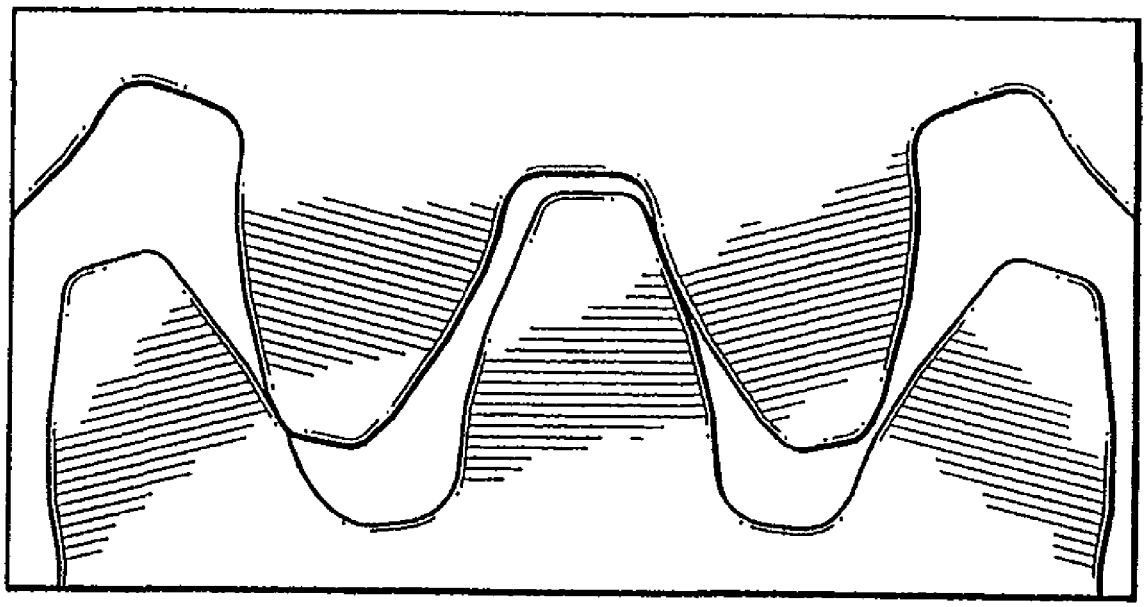
FIG. 35 illustrates a virtual gear mesh representation of the initial 15T to 20T design.
Figure 36:
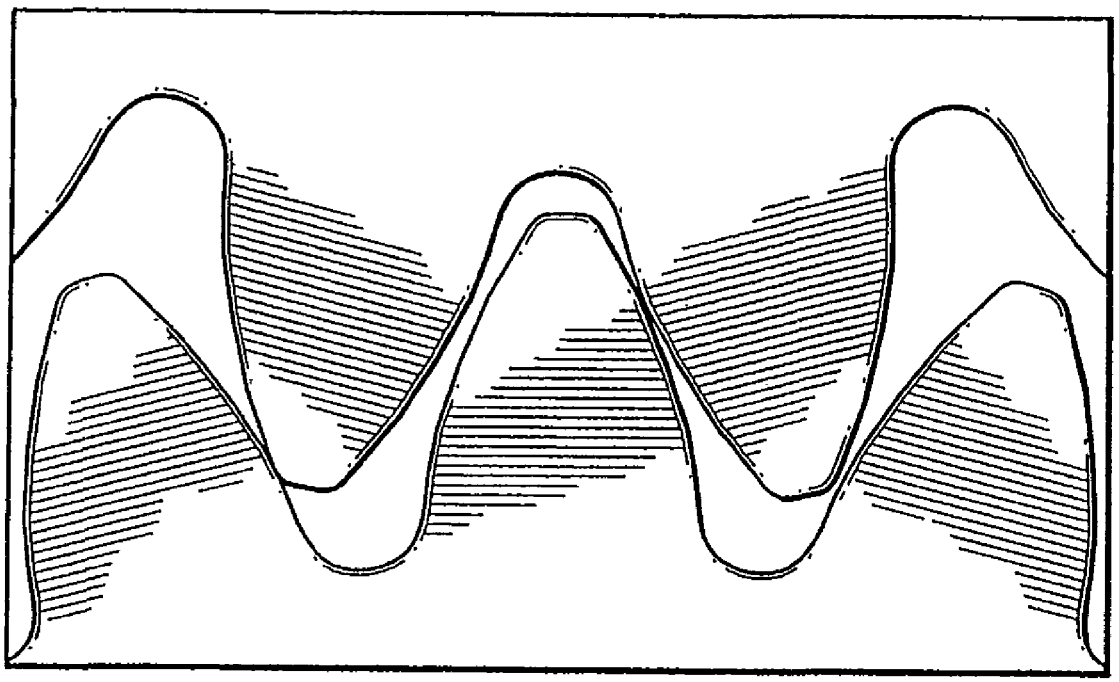
FIG. 36 illustrates a virtual gear mesh representation of the revised 15T to 20T design.
Figure 37:
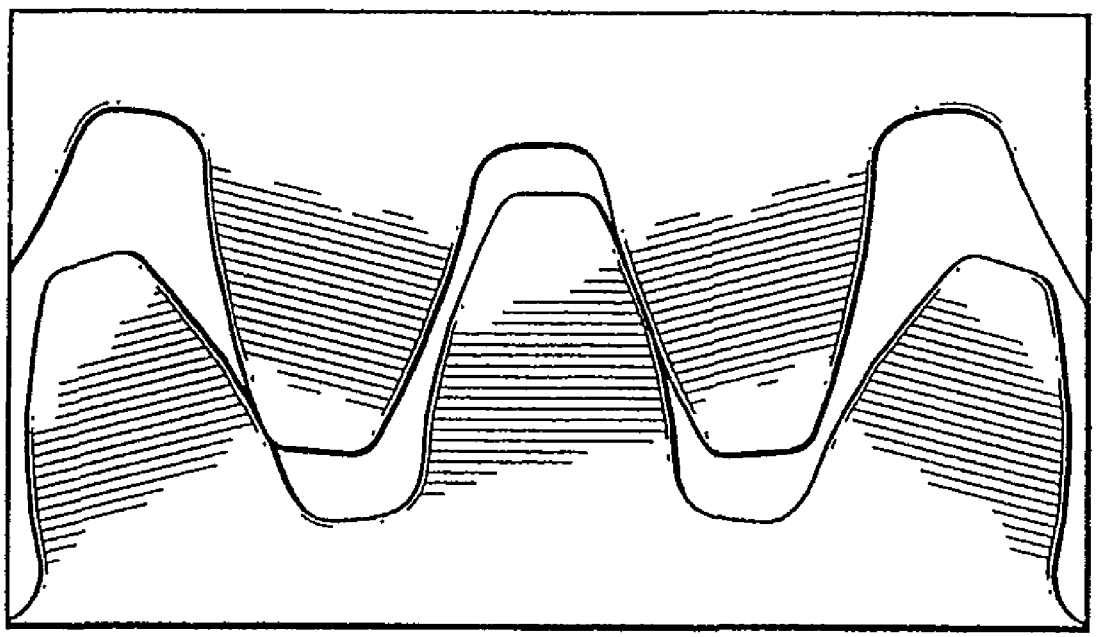
FIG. 37 illustrates a virtual gear mesh representation of the initial 34T to 20T design.
Figure 38:
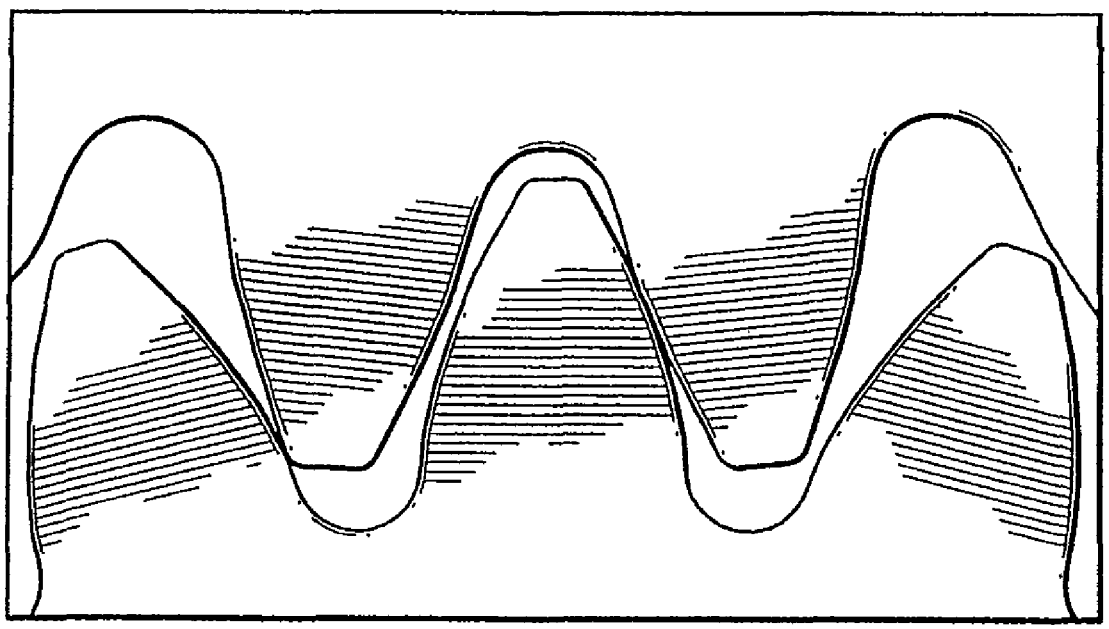
FIG. 38 illustrates a virtual gear mesh representation of the revised 34T to 20T design.
Figure 39:
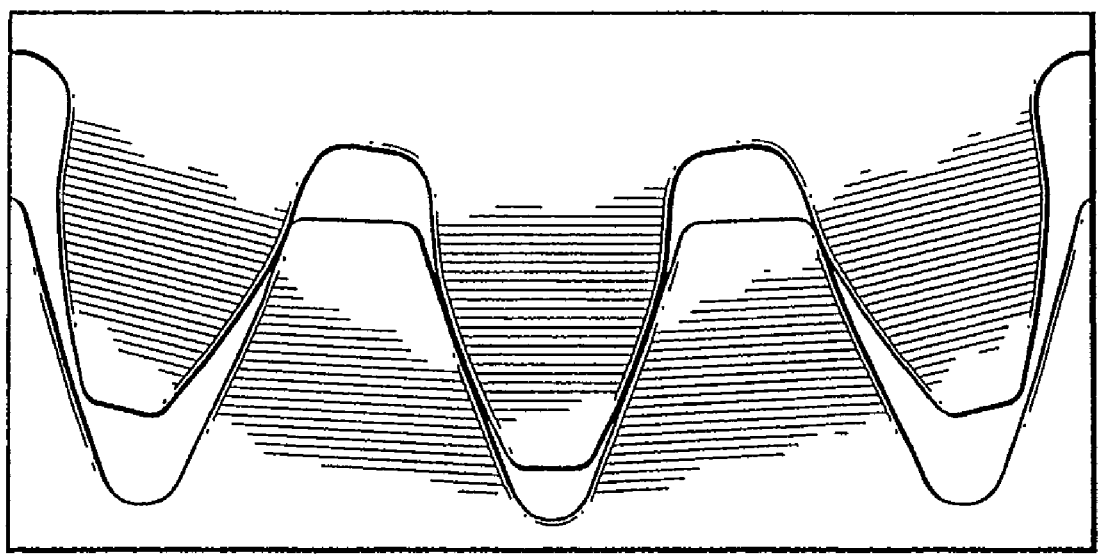
FIG. 39 illustrates a virtual gear mesh representation of the initial 20T to ring gear design.
Figure 40:
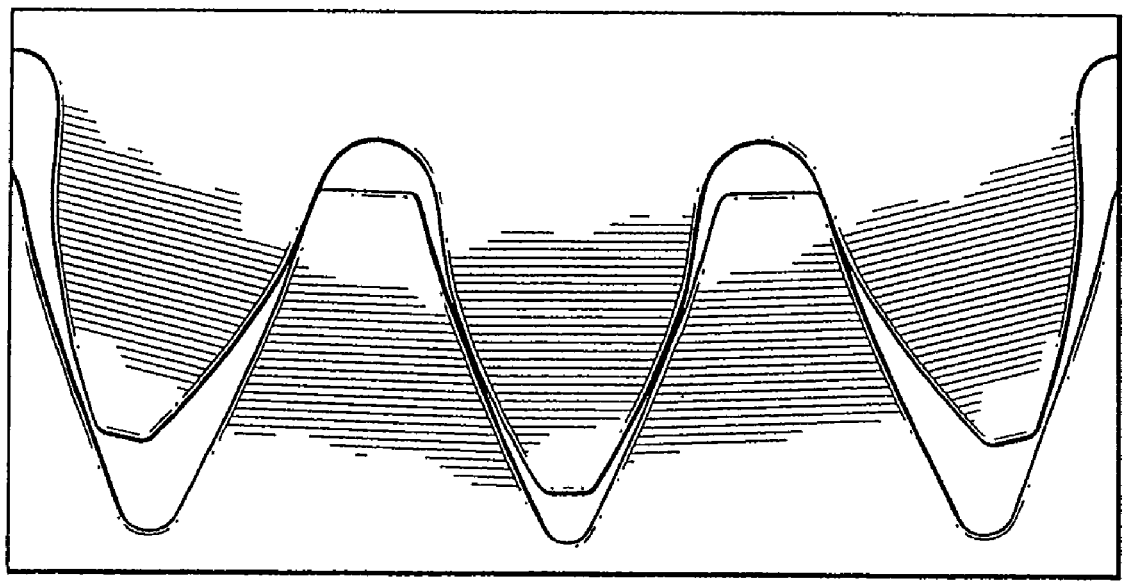
FIG. 40 illustrates a virtual gear mesh representation of the revised 20T to ring gear design.

If kept free of contamination the valve body will conceivably function indefinitely. However, when contamination occurs, some of the components will wear. The point of wear is the 2/3-boost sleeve 150, shown in FIG. 30, which is made of aluminum. The transmission of the instant invention has a new design boost sleeve installed in this position that is especially designed for this application. The geometry of the boost sleeve has been changed to allow more oil to react to the shifting lands of the shift valve. In so doing the valve is more sensitive and produces a more repeatable point of shift. The material from which the boost sleeve was made is still aluminum but the alloy is changed to 5056 in order to increase wear resistance and reduce the binding affects that small particles of metal create on the inner shift valve. The leading edges of the valve sleeve are very sharp by design and function as wipers to the valve spool in much the same way that any oil seal protects the inner parts of a mechanism form external dirt contamination. By increasing the valve sleeve's resistance to wear the sharp edges are maintained for a longer period of time during contamination. This new 2/3 shift valve spool will extend the life of the transmission even after metal contamination begins by keeping the small abrasive metal particles from getting between the valve and spool thus maintaining proper valve function.

7. Low Servo Spring:

The rear clutch band that holds the rear reaction sun-gear and band drum from turning would, under extreme conditions, allow the sun-gear and drum assembly to rotate when it should not. This condition contributes to premature band friction failure which adversely affects the operating life of the transmission. In order to eliminate this malfunction a new low servo spring was designed. The low servo spring is applied within the system in a release configuration thus assuring that when the rear band holding function is not utilized (third gear) the band is off and the band drum rotates freely. The new design low servo spring tension is reduced. In order for the low band to be applied the force created by the oil pressure exerted against the low servo piston must overcome the spring pressure created to hold it off. By reducing the amount of negative pressure created by the low servo spring, the amount of force remaining to apply the band was increased resulting in more pressure applied to the low band friction material. In so doing, the holding capacity of the low band is increased eliminating the slippage of the rear band thus contributing to the extended life of the transmission.

The instant invention also contemplates the remanufacture of the torque converter of the 180C transmission. The remanufacture of a torque converter involves the proper handling and restoration of five parts:

1. The primary pump.
   2. The stator assembly.
   3. The turbine.
   4. The clutch and damper assembly.
   5. The cover.

The torque converter begins the remanufacturing process by being cut in half. The closure weld that was applied when first manufactured must be removed by the use on a lathe and the pad plane and z-axis are held to within 0.002" TIR. The replaceable parts, two thrust bearings and an o-ring seal, are removed and discarded. The parts then are washed and sent to their respective remanufacturing cells.

The primary pump is comprised of a series of half moon shaped internal fins that are attached to steel stamping of the same shape in a radial pattern. An impeller hub is then welded in the center of the stamping that holds the fins. The restoration of 280PS™ converter begins with the welding of the half moon fins to the impeller stamping and the removal of the old impeller hub. The impeller hub removal process consists of removing the complete center of the primary pump to which the old impeller hub was welded. This extensive removal of material is required in order to replace the bearing and impeller hub support area with a newly designed one piece impeller hub and bearing support. This new impeller hub and bearing support also moves the heat affected zone caused by the welding attachment process to a larger diameter eliminating the distortion of the bearing surface which is the result of contraction of the three alloys during the welding process. The installation of a new flanged impeller hub increases the strength of the main bearing thrust area between the primary pump and the stator and reduces the bearing surface's tendency to distort during operation due to the lateral load exerted on the hub by the inner pump gear. At the same time the added flange strength prevents the impeller hub from being forced off center by the force of the same inner pump gear. (See illustration 18) The primary pump is then machined to restore all datum plains. The primary pump is then washed a second time and is ready for assembly.

The stator assembly is made up of the aluminum housing which contains the fins that redirect the oil form the turbine to the primary pump and a one way roller clutch. The bearing cap is removed from the primary pump side of the stator and the one way roller clutch is inspected. If any contamination is detected the entire assembly is rebuilt. This involves the removal of the inner race, the rollers, and the discard of internal springs. The inner race is tumbled to remove all traces of the old roller signature and the clutch is reassembled with new springs and new or good rollers. The bearing cap is then inspected for wear and discarded is wear is detected. The new or good used cap is replaced and the stator is moved to the assembly area.

The turbine is built in much the same way as the primary pump. The points of wear are the input shaft spline and the thrust surface. The turbine spline is inspected and if more than 10% wear is detected the turbine is discarded or if needed, the old spline hub is removed and a new spline hub is welded in the center of the turbine. The C shaped thrust washer is inspected and if worn discarded. After final inspection the turbine is moved to the assembly area.

The clutch and damper assembly is made up of a formed steel plate to which the friction ring is bonded and a series of springs attached and arranged in a circle about the turbine spline hub. The points of failure are broken springs, worn or contaminated friction ring, and worn seal surface. If springs are broken the damper assembly is discarded, if seal surface is damaged the surface is restored, if the friction ring is worn it is cutoff and new friction ring is bonded to the damper assembly. After a final inspection the clutch and damper assembly is moved to the assembly area.

The cover is a single piece. This piece contains five critical areas. The first is the pilot diameter. This pilot must measure 0.825"+/−0.002". If the pilot is out of specification the pilot is welded and a new diameter is cut to specification. All of the pad surfaces are reconditioned as well as the threads contained in each pad. The friction surface is then restored by machining 0.010" off the surface to produce a good friction surface. After final inspection the cover is moved to the assembly area.

The assembly process proceeds as follows, new bearings are installed on either side of the stator and the stator installed on the primary pump. A new o-ring is installed on the turbine and the turbine is installed on the stator. The reconditioned clutch and damper assembly is assembled on the turbine hub and the cover is installed on the turbine. The converter then proceeds to the closure welder where a new closure weld is installed.

The converter run-out and end play is checked and the finished converter is balanced to 10 grams or less. The run-out is checked by placing the impeller hub in a six-jaw chuck and extending the pilot vertically. An indicator reading is taken form the extended pilot. The total indicator reading can not exceed 0.010" or the converter is rejected.

When all of the above part improvements are incorporated into the 280PS™ transmission of the instant invention, the result is a transmission that will function in service at least thirty percent longer than the current state of the art transmission, the 180C. All of the observed areas of failure have been addressed in this system. The strength of planetary gear train has been increased and thus the effective life extended. The pump has had a SAE 660 bronze sleeve installed to eliminate the outer pump gear wearing against the pump housing. The pump inner crescent has been changed to eliminate inner gear interference thus removing noise and any possibility of metal generation. The pressure regulation system has been corrected and the lubrication circuit changed to allow for full time lubrication of the converter and gear train. The bell housing has been changed to allow for in service alignment thus eliminating wear on all associated parts. The rear servo spring has been changed to afford greater rear band holding capacity. The converter has been remanufactured to the highest standards that exist within the art today. The valve body has been remanufactured to remove all wear from previous life and has been restored to exceed OEM standards. The friction material on the rear band and the intermediate clutch has been changed to eliminate the affects of increased heat, and finally the oil that is recommended is by far the accepted standard within the industry for extending the life of any transmission.

Rigorous testing of one embodiment of the instant invention that simulated long term use of the transmission identified areas where additional improvements can be made:

a) Bearing pin wear of the 15 tooth short pinion directly in line with the separation forces coming from the 20 tooth pinion b) Loss of alignment with mating 20 tooth long pinion and 26 tooth sun gear causing tip loading, wear and pitting c) Contamination of transmission oil with the worn particles causing accelerated failure in other mechanical and hydraulic components.

One surprising result from the evaluation of the components was that there was relatively little wear on the 20 tooth pinion bearing pin which is made of the same material and heat treatment, although a slightly larger size. It would be expected that the torques in the 20 tooth gear would be higher, and the pin wear would be larger, which was not the case. This raised the question as to the actual torques achieved in each gear in the mesh during the validation testing.

Calculation of Transmission Torques

An evaluation was conducted to determine the speed and torques that are achieved in each gear for each speed condition of the transmission (i.e. $1^{st}$, $2^{nd}$ and $3^{rd}$ gear shift condition). During this evaluation, it was discovered that the $1^{st}$ gear condition had the highest torques in the system, which for this transmission happens to be the most often used shift condition in the field and during validation testing.

Table 1 shows data representing the $1^{st}$ Gear Configuration:

Speed and Torque of Each Component
  With Fixed 34 T Output Sun—$1^{st}$ Gear Configuration
  +ve Is CW Let N=the speed of S1 when the carrier is held rigidly. Let $T_c$=the torque of the output carrier

|  | 26 T $S_1$ | 15 T $P_1$ | 20 T $P_2$ | 74 T $R_1$ | CARRIER | 34 T $S_2$ |
|---|---|---|---|---|---|---|
| Speed With Fixed Carrier | N | $-\frac{S_1 N}{P_1}$ | $+\frac{S_1 N}{P_2}$ | $+\frac{S_1 N}{R_1}$ | 0 | $-\frac{S_1 N}{S_2}$ |
| Adjustment For Fixed 34 T Output During $1^{st}$ Gear |  |  |  |  | $+\frac{S_1 N}{S_2}$ |  |
| Total Speed Equation | $N\left[1+\frac{S_1}{S_2}\right]$ | $NS_1\left[\frac{1}{S_2}-\frac{1}{P_1}\right]$ | $NS_1\left[\frac{1}{S_2}+\frac{1}{P_2}\right]$ | $NS_1\left[\frac{1}{S_2}+\frac{1}{R_1}\right]$ | $\frac{S_1 N}{S_2}$ | 0 |
| Value for N Based on $S_1$ Speed of 3500 RPM Achieved During Testing |  |  | 1983.333 |  |  |  |
| Total Speed Value (RPM) | 3,500 | −1,921 | 4,095 | 2,214 | 1,517 | 0 |
| Total Torque Equation @ 100% Efficiency Based on a Known output Torque $T_c$ | $\frac{T_c}{\left[1+\frac{S_2}{S_1}\right]}$ | $\frac{T_c}{\left[1-\frac{S_2}{P_1}\right]}$ | $\frac{T_c}{\left[1+\frac{S_2}{P_2}\right]}$ | $\frac{T_c}{\left[1+\frac{S_2}{R_1}\right]}$ | $T_c$ | — |
| Total Torque (ft lbs) Based on $T_c$ Value of 375 ft lbs | 162.5 | −296.0 | 138.9 | 256.9 | 375.0 | — |

From these data, it is clear that the 15 tooth pinion has a significantly higher operating torque in $1^{st}$ gear than the 20-tooth pinion. The torques are 214% higher even though the bearing pin is slightly smaller on the 15 tooth gear bearing pin than on the 20 tooth gear bearing pin.

Component Design Review

The components of the transmission were evaluated to determine how to further improve performance in the following areas:
  1) Delay the 15 tooth gear bearing pin from wearing
  2) Improve the pitting resistance and bending load carrying capacity of the gear sets to delay the wear of components.
  3) Improve the alignment of gears to delay the wear of components.
  4) Improve the load sharing of each of the planet gears to prevent premature failure of only one or two components.

Bearing Pin and 15 Tooth Gear Interface

The needle bearing sizing and spacing was evaluated and compared to the needle bearing sizing and spacing used on the 20 tooth pinion gear. In terms of load carrying capacity, the bearing for the 20 tooth pinion is capable of carrying approximately 2.42 times the load of the 15 tooth pinion, because there are 23 needles as compared to 19 on the 15 tooth pinion, and there is a double bearing arrangement. For a given size needle roller, the load carrying capacity can be conservatively estimated as being directly proportional to the number of needle rollers.

In addition, it was found that in the maximum material condition, there was a 0.529 mm gap, which could potentially allow for misalignment of the needles during rotation. This gap is recommended to be approximately 0.130 mm.

A redesign of the bearing pin arrangement was conducted with emphasis on increasing the load carrying capacity on the 15 tooth pinion bearing as much as possible. The new design consists of a bearing pin of diameter 11.170+/−0.005 mm, 21 needle rollers (instead of 19), and an inner bore on the 15 tooth gear of 15.180+/−0.005 mm. The maximum gap is now 0.130 mm. Using this approach, the load carrying capacity by conservative estimates will increase by 10.5%.

In addition, the benchmarked design washers do not allow for transmission fluid to flush through the needle bearing pack. With improved flushing, overheating problems in the bearing will be reduced and a low friction coefficient maintained. To improve the flushing of the fluid, the steel and phosphor bronze washer inner diameters have been increased to 12.55+0.07/−0 mm.

The material and heat-treating choices were reviewed for the bearing pin to determine if a more wear resistant pin can be produced. The current material is SAE 52100 Quench and Tempered to 60-64 HRC. A change in the allowable surface roughness from 0.4a to 0.2a to delay the wear of these components is advantageous.

Gear Pitting Resistance & Bending Strength

All existing meshes are geometrically sound (i.e. no contact in undesirable areas, minimum contact ratios above 1.0 (other than ring gear mesh), and sufficient backlash) for the mesh condition as described by the drawings. However, for the most part, each of the meshes has not been optimized for Pitting Resistance and Bending Strength. A redesign and optimization process for the meshes has now been conducted. The methodology that is used to quantify these design improvements is to use AGMA's (American Gear Manufactures Association) calculating methodology for Pitting Resistance (I) and Bending Resistance (J) Factors.

The new gear geometry is detailed in FIGS. 31-32. FIGS. 33-40 illustrate the initial and revised mesh conditions in each stage. Tables 2-4 show the initial and final I and J factors and the % improvement achieved. In each case, improvements to pitting resistance, and bending strength have been achieved by changing the designs to full fillet radii from sharp fillet radii, and by optimizing tooth proportions to provide more load sharing.

TABLE 2

I &J Factor Comparisons for 15-26 Tooth Mesh

| | 15 Tooth Short Pinion | | | 26 Tooth Sun | | |
|---|---|---|---|---|---|---|
| | Initial | Revised | % Improvement | Initial | Revised | % Improvement |
| Bending Strength Geometry J Factor | .4566 | .5136 | 12.5% | .3940 | .4984 | 26.5% |
| Pitting Resistance Geometry I Factor | .1455 | .1721 | 18.3% | .0805 | .0918 | 14.0% |

TABLE 3

I &J Factor Comparisons for 15-20 Tooth Mesh

| | 15 Tooth Short Pinion | | | 20 Tooth Sun | | |
|---|---|---|---|---|---|---|
| | Initial | Revised | % Improvement | Initial | Revised | % Improvement |
| Bending Strength Geometry J Factor | .4642 | .5026 | 8.3% | .3942 | .4928 | 25.0% |
| Pitting Resistance Geometry I Factor | .1322 | .1522 | 15.1% | .0965 | .1087 | 12.6% |

TABLE 4

I &J Factor Comparisons for 34-20 Tooth Mesh

| | 34 Tooth Sun | | | 20 Tooth Sun | | |
|---|---|---|---|---|---|---|
| | Initial | Revised | % Improvement | Initial | Revised | % Improvement |
| Bending Strength Geometry J Factor | .4235 | .4892 | 15.5% | .4354 | .5501 | 26.3% |
| Pitting Resistance Geometry I Factor | .0839 | .0978 | 16.6% | .1500 | .1755 | 17.0% |

A review of the existing mesh characteristics for the internal/external combination reveal that, geometrically, that the contact ratio is slightly less than the 1.0 that is the usual practice in gear design. In order to correct this condition (which will also improve the strength performance) the minor diameter of the ring gear are reduced. I and J factors are not calculated for internal gear meshes as AGMA does not have an accepted practice to do this.

Review of Alignment Issues

As stated previously, pinion-bearing pin wear causes loss of alignment of the gear meshes. This will eventually lead to premature pitting, wear and breakage of gear teeth, which further contaminates the transmission oil in the system. In addition, positioning and size control of the planets will improve load sharing and further reduce wear.

Improvements in positioning and alignment of the gear meshes improve the life of the gear train. Positioning and alignment have been improved by the following methods:

1) Addition of 0.25 mm of tip relief on the gears by modification of the shaving cutter tools 2) Increase the crowning on the gear teeth from 0.006 mm to 0.03 mm.

3) Reduce total composite error on the planets to a maximum specification of 0.038 mm to improve consistency and load sharing.

Additional Improvements

Gear hub breakage has been of concern. The hub material is currently 4140, quenched and tempered. The material has been changed to 8620, then normalized and carburised to improve this condition.

The additional modifications to the transmission of the instant invention can be summarized as follows:

1) 15 Tooth Pinion Bearing Assembly is to be resized for an improved fit 2) 15 Tooth Pinion Bearing Pin to have surface roughness controlled to 0.2a finish 3) All gears to be redesigned to increase the bending strength and pitting resistance.

Profiles will have full fillet radii, and long addendum tooth profiles.

4) Gears to have tip relief added to reduce alignment concerns.

5) Gears to have 0.030 mm of crowning added to reduce alignment concerns.

6) Total composite errors on planet gears to be maintained to below 0.038 mm to improve load-sharing capability.

7) Gear hub material to be changed to 8620 normalized and carburised to reduce hub cracking concerns.

The transmission of the instant invention must be used as a total replacement of the previous design. The individual dimensions of the critical parts, that being the front sun gear and hub assembly, the planetary carrier and pinion gears, the rear sun gear and band drum, and the ring gear are not compatible with any other critical part of the previous design. These parts will however fit in any current market application (180C transmission) when installed as a complete assembly. Examples of which would be an Opal Olympia, the GEO Tracker, Chevette, and Postal delivery vehicles. The proper installation of these parts in a 180C transmission requires only an ordinary level of skill in the art of transmission rebuilding.

EXAMPLE 1

Referring primarily to FIGS. 25a-25b and 26a-26b, but also to various other figures, the disclosed planetary gear train 100 is compound in nature. The transmission is composed of eight pinion gears, four of which 102 are compound (see also FIGS. 1a-1b), and four 104 that are plain (see also FIGS. 3a-3b), all eight gears being assembled into one carrier 106 utilizing a forward sun gear 108 and a rear sun gear 110, a ring gear 112, a band drum 114 with a bushing 115 received therein and a one way roller clutch. The four plain pinion gears 104 mesh with the four compound gears 102 and the forward sun gear 108 and one way roller clutch. The four compound pinion gears 102 also mesh with the four plain pinion gears 104, the front sun gear 108, the ring gear 112 and the rear sun gear 110. A 2.8 reduction is achieved by applying the rear band and driving the planetary assembly 100 by the front sun gear 108 through the one way roller clutch. (First gear) A 1.8 reduction is achieved by applying the intermediate clutch, thus driving the planetary by the ring gear 112 and over running the one way roller clutch. (Second gear) Third gear is achieved (one to one) by applying the direct clutch, and releasing the rear band maintaining the application of the intermediate clutch thus locking the ring gear 112 and front sun gear 108. The unique nature of this transmission lies in the size of the pinion gears 102, 104, the pressure angle to which they are cut and the method of assembly. This unique combination produces a gear train 100 that is thirty-three percent stronger than current design and is four decibels quieter in operation.

Figure 2B:
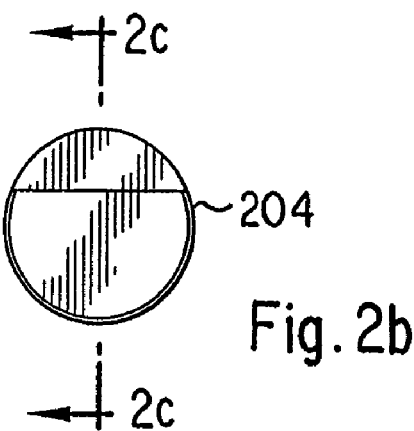
FIGS. 2a-2c illustrate a compound pinion pin, with FIG. 2a showing the pin in perspective, FIG. 2b showing the pin from one end, and FIG. 2c showing the pin in cross section.
Figure 2C:
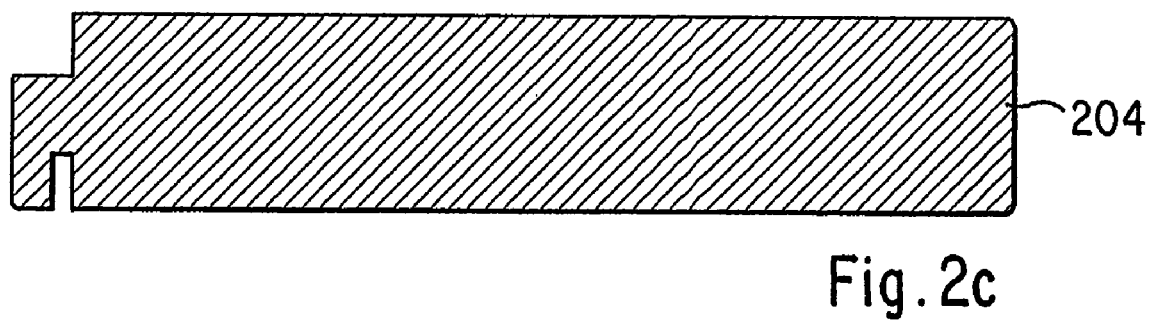
Figure 2A:
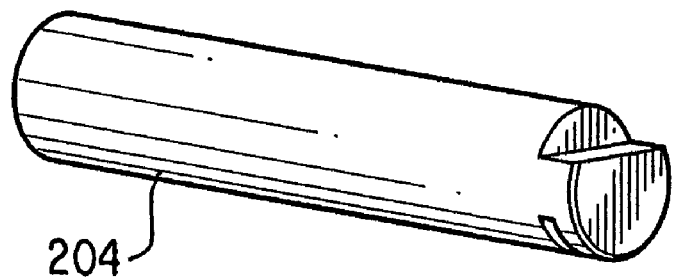
Figure 4C:
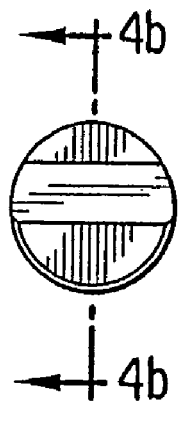
FIGS. 4a-4c illustrate a plain pinion pin, with FIG. 4a showing the pin in perspective, FIG. 4b showing the pin in cross section, and FIG. 4c showing the pin from one end.
Figure 4B:
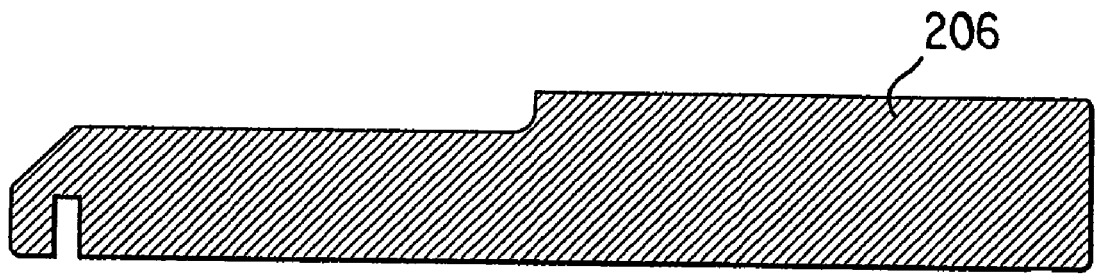
Figure 4A:
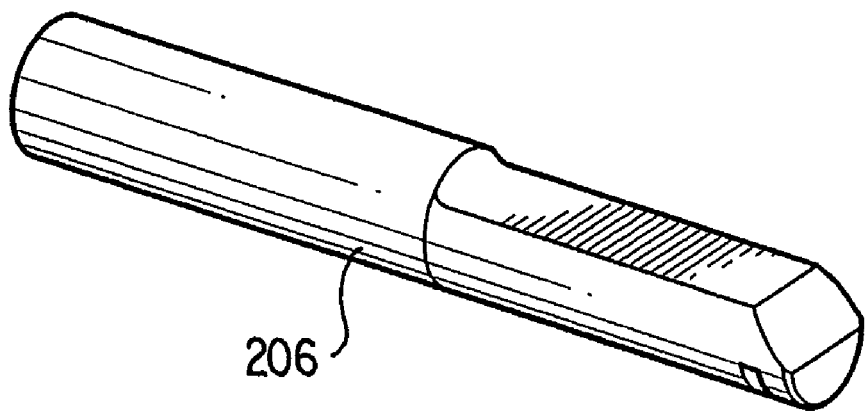
Figure 18C:
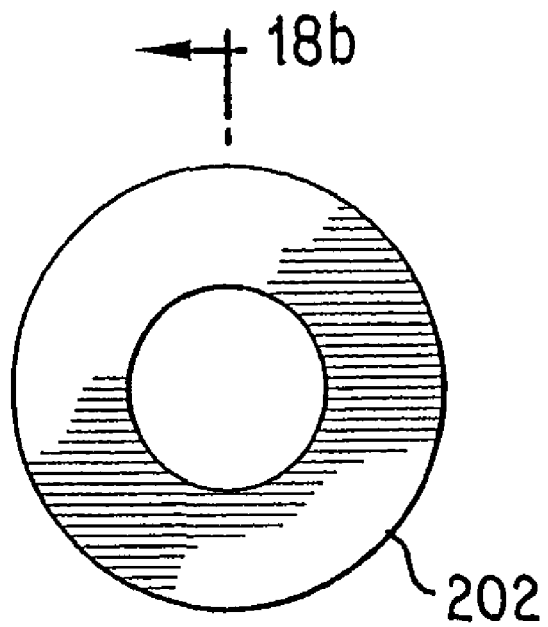
FIGS. 18a-18c illustrate a small washer.
Figure 18B:
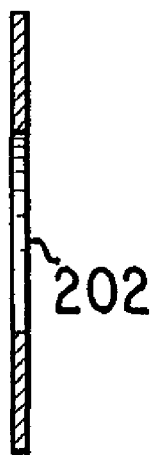
Figure 18A:
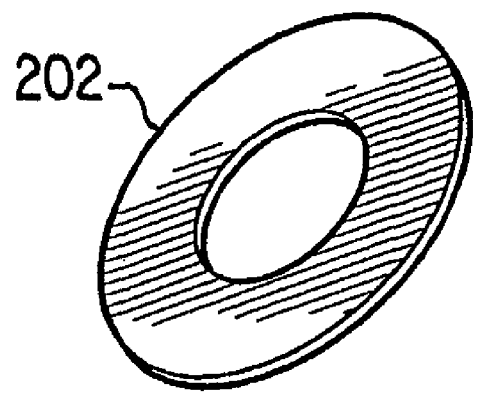
Figure 20B:
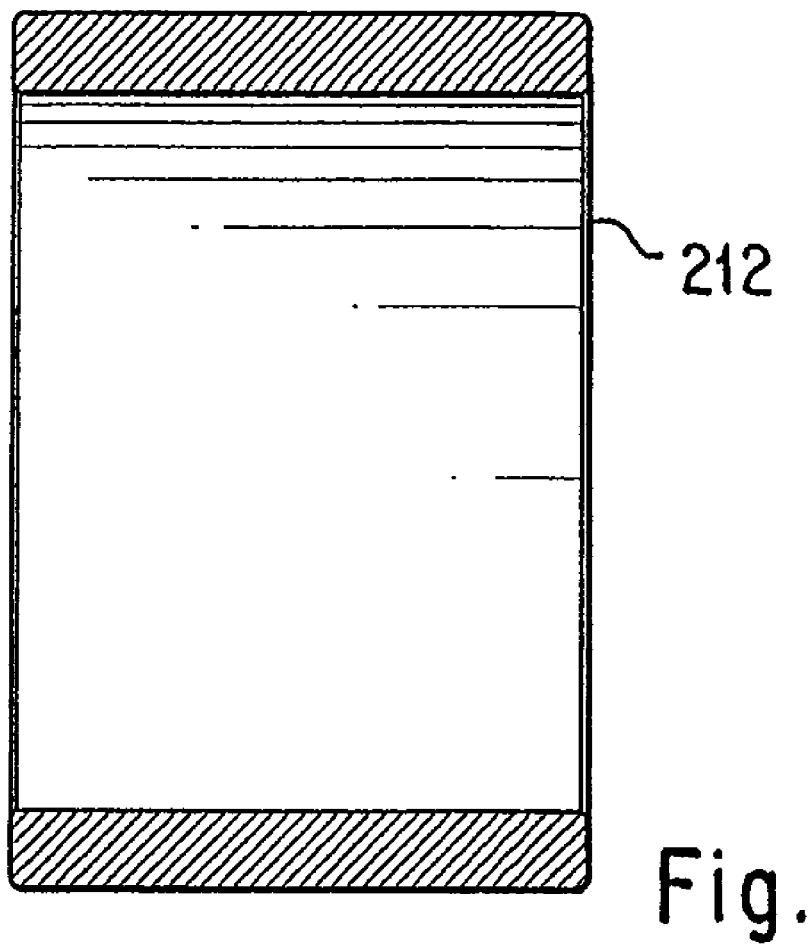
FIGS. 20a-20b illustrate a needle sleeve.
Figure 20A:
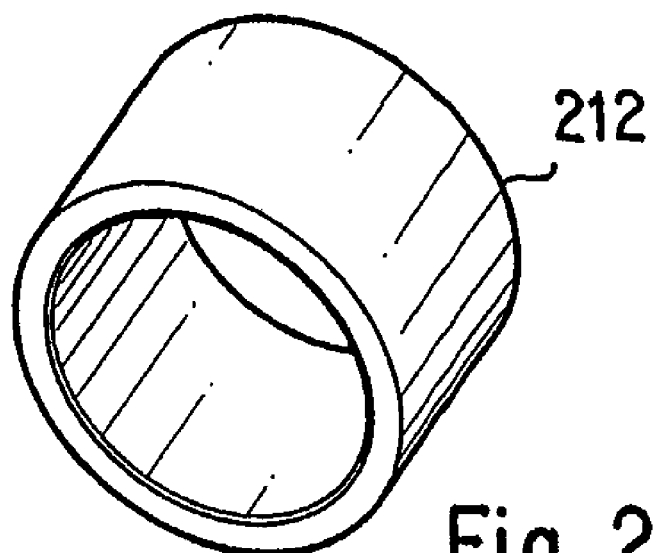
Figure 21B:
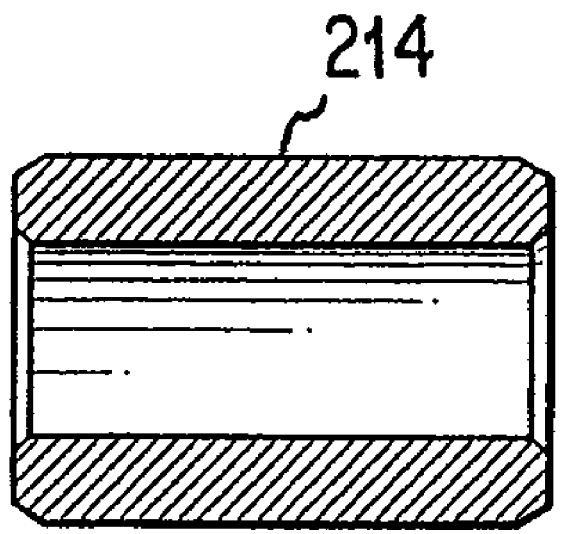
FIG. 21 illustrates a plug.
Figure 21A:
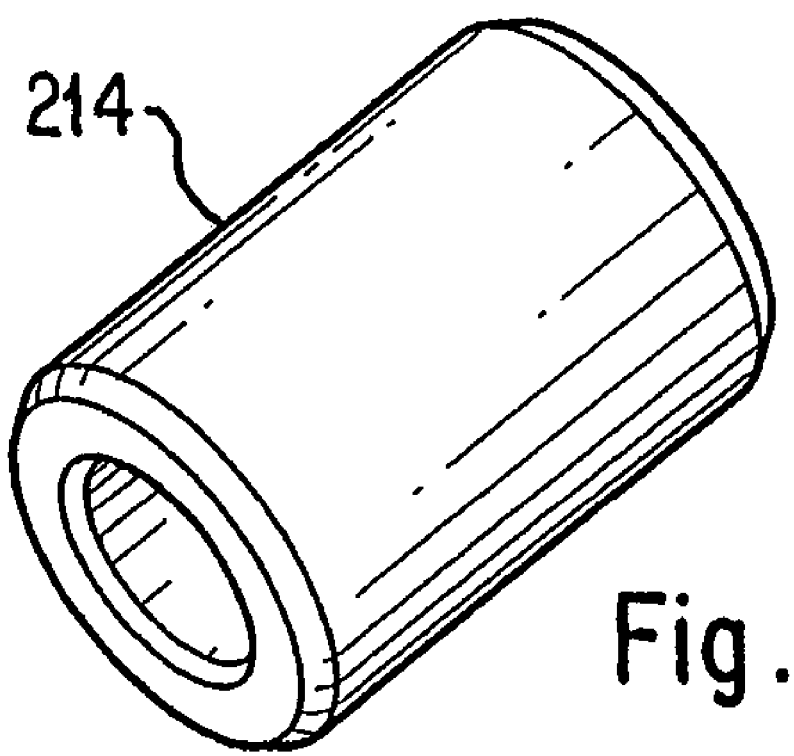
Figure 22B:
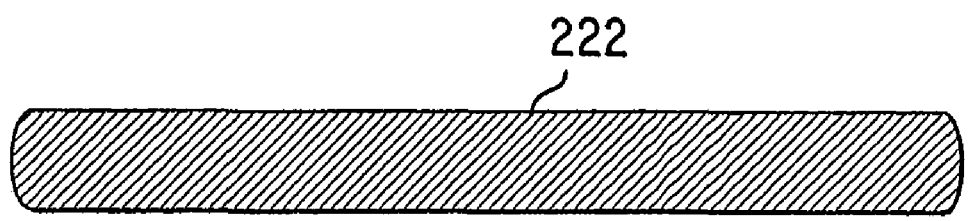
FIG. 22 illustrates a needle roller.
Figure 22A:
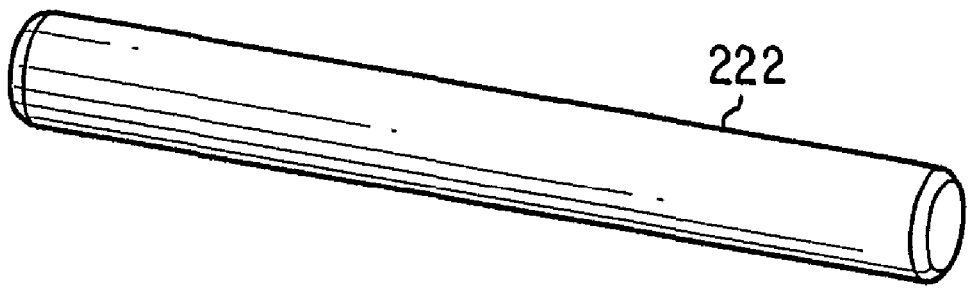
Figure 24A:
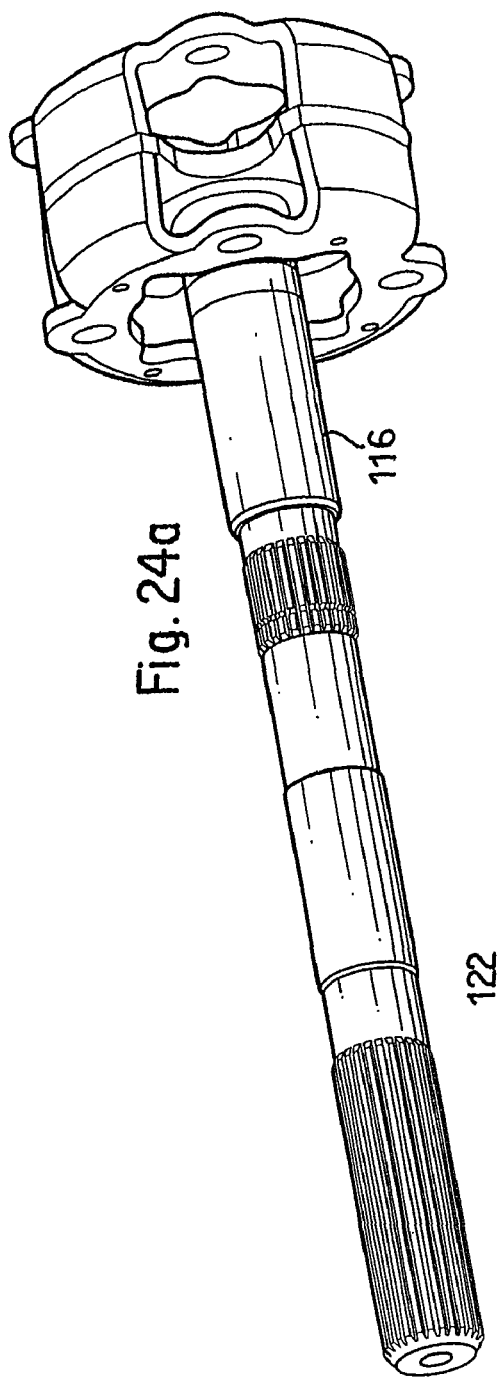
FIG. 24 illustrates an assembled body.
Figure 24B:
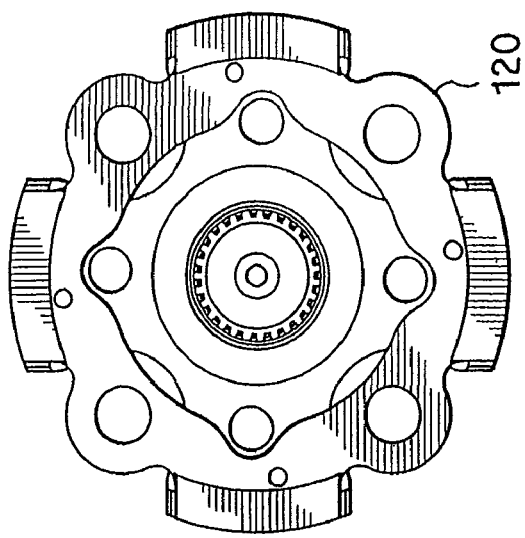
Figure 24C:
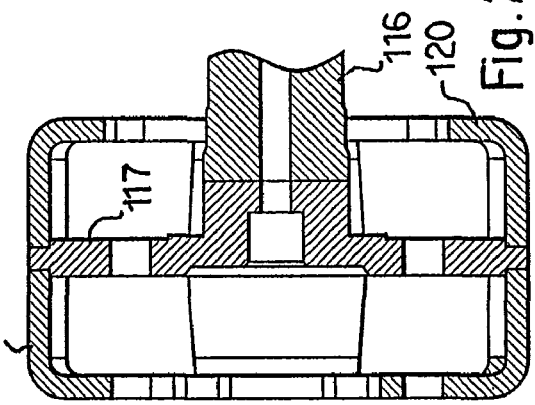
Figure 24D:
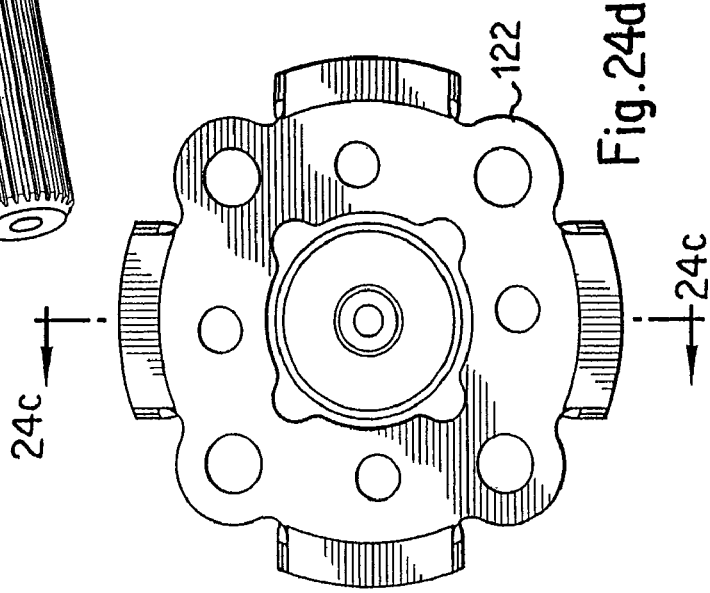

Also indicated in FIGS. 26*a*-26*c* are rivets 200, a small phosphor bronze washer 202 (see also FIGS. 18*a*-18*c*), a compound pinion pin 204 (see also FIGS. 2*a*-2*c*), a plain pinion pin 206 (see also FIGS. 4*a*-4*c*), an output shaft 116 (see also FIGS. 5*a*-5*c*), a lock plate 117 (see also FIGS. 17*a*-17*c*), a small SK5 washer 218, a large SK5 washer 210 (see also FIGS. 19*a*-19*c*), a needle sleeve 212 (see also FIGS. 20*a*-20*b*), a plug 214 (see also FIGS. 21*a*-21*b*), a large phosphor bronze washer 216, and a needle roller bearing 220 including needle rollers 222 (see also FIGS. 22*a*-22*b*).

Figure 1B:
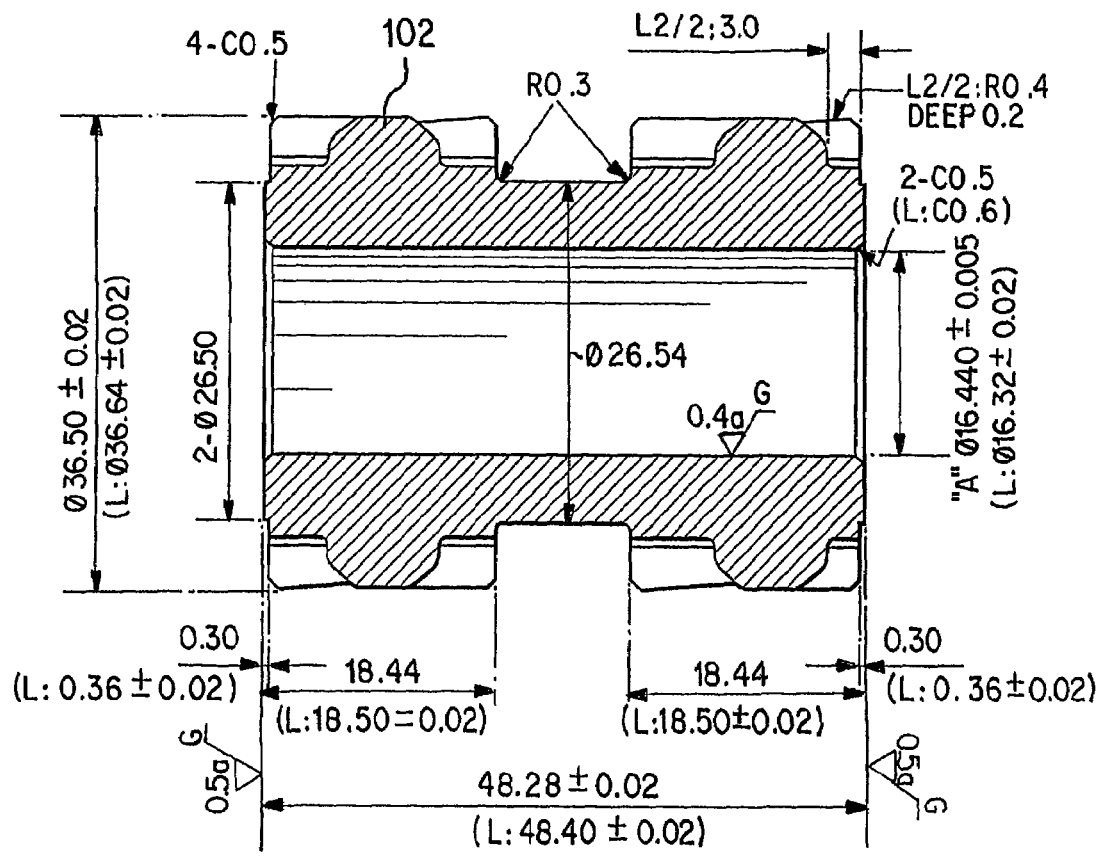

Assembly of the gear train:

1. Compound pinion gear 102 (FIGS. 1*a*-1*b*)

| | |
|---|---|
| A. number if teeth | 20 |
| B. module | 1.5 |
| C. pressure angle | 18 |
| D. helix angle | 18.16 |
| E. pitch diameter | 30.0 |
| F. major diameter | 33.58 |
| G. minor diameter | 28.64 |
| H. pitch diameter | 22.50 |
| I. pin diameter | 3.0 |
| J. material | SAE 8620 |

Figure 3A:
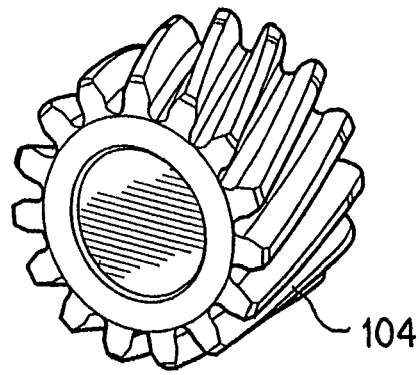
FIGS. 3a-3b illustrate a plain pinion gear, with FIG. 3a showing the gear in perspective, FIG. 3b showing the gear in cross section, and FIG. 3c showing parameters.
Figure 3B:
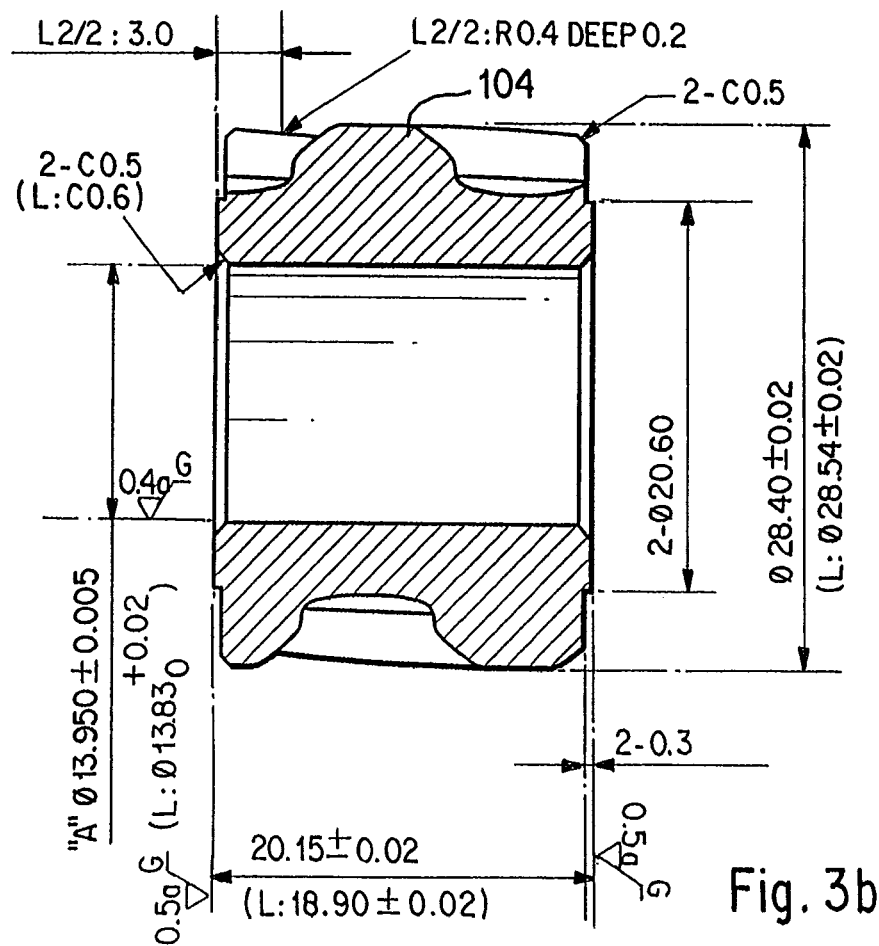

2. Plain pinion gear 104 (FIGS. 3*a*-3*b*)

| | |
|---|---|
| A. number of teeth | 15 |
| B. module | 1.5 |
| C. pressure angle | 18 |
| D. helix angle | 18.16 |
| E. hand | left |
| F. pitch diameter | 22.50 |
| G. major diameter | 28.07 |
| H. minor diameter | 21.67 |
| I. pin diameter | 3.0 |
| J. material | SAE 8620 |

3. Output shaft 116 and flange 118 (FIGS. 5*a*-5*c*)

| | |
|---|---|
| A. number of teeth (shaft) | 27 |
| B. diametrical pitch | 24 |
| C. pressure angle | 30 |
| D. major diameter | 29.30 |
| E. minor diameter | 26.82 |
| F. pin diameter | 1.5 |
| G. material Shaft | SAE 4140 |

-continued

| | |
|---|---|
| H. material flange | SAE 1045 |
| I. method of attachment | friction welding |

4. Upper shell 120 (FIGS. 6*a*-6*d*)

| | |
|---|---|
| A. Material | SAE 1010 |
| B. Method of attachment | Laser welding (As per FIG. 6) |

5. Lower shell 122 (FIGS. 7*a*-7*d*)

| | |
|---|---|
| A. Material | SAE 1010 |
| B. Method of attachment | Laser welding (As per FIG. 6) |

Figure 8B:
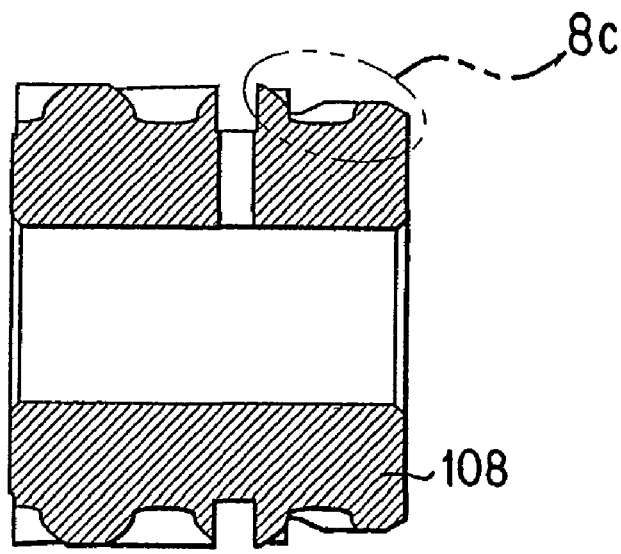
Figure 8C:
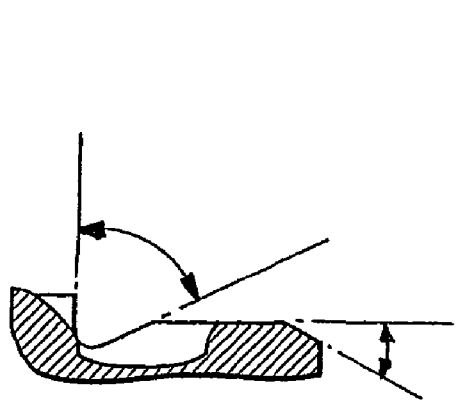
Figure 8A:
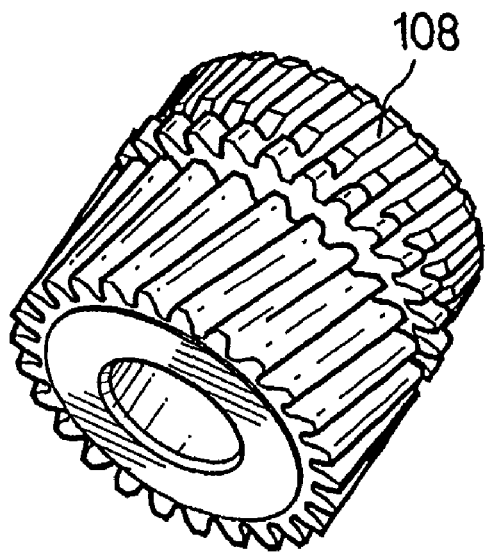

6. Assembled body
7. Front sun gear 108 (FIGS. 8*a*-8*c*)

| | |
|---|---|
| A. Number of teeth | 26 |
| B. Module | 1.5 |
| C. Pressure angle | 18 |
| D. Helix angle | 18.16 |
| E. Major diameter | 44.60 |
| F. Minor diameter | 38.00 |
| G. Material | SAE 8620 |

Figure 9C:
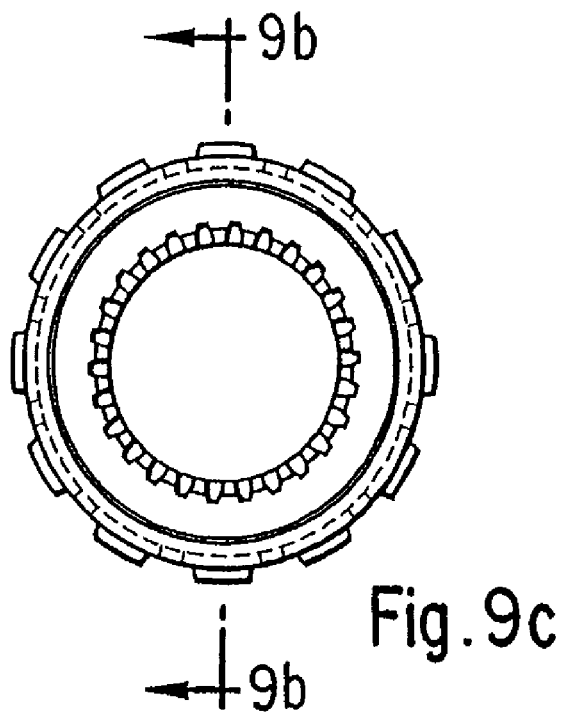
Figure 9B:
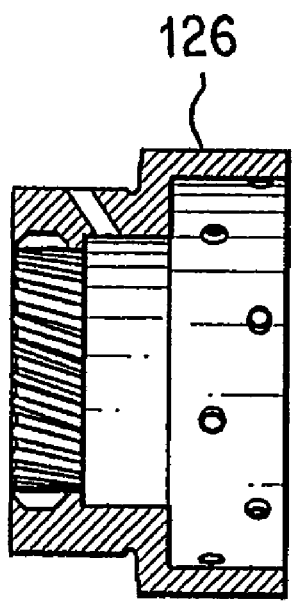
Figure 9A:
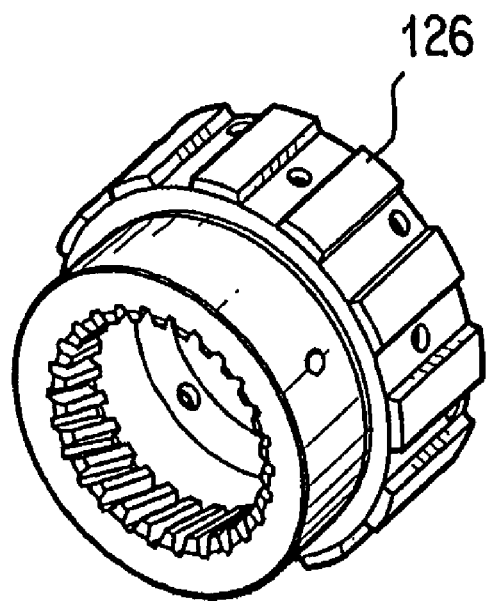
Figure 10:
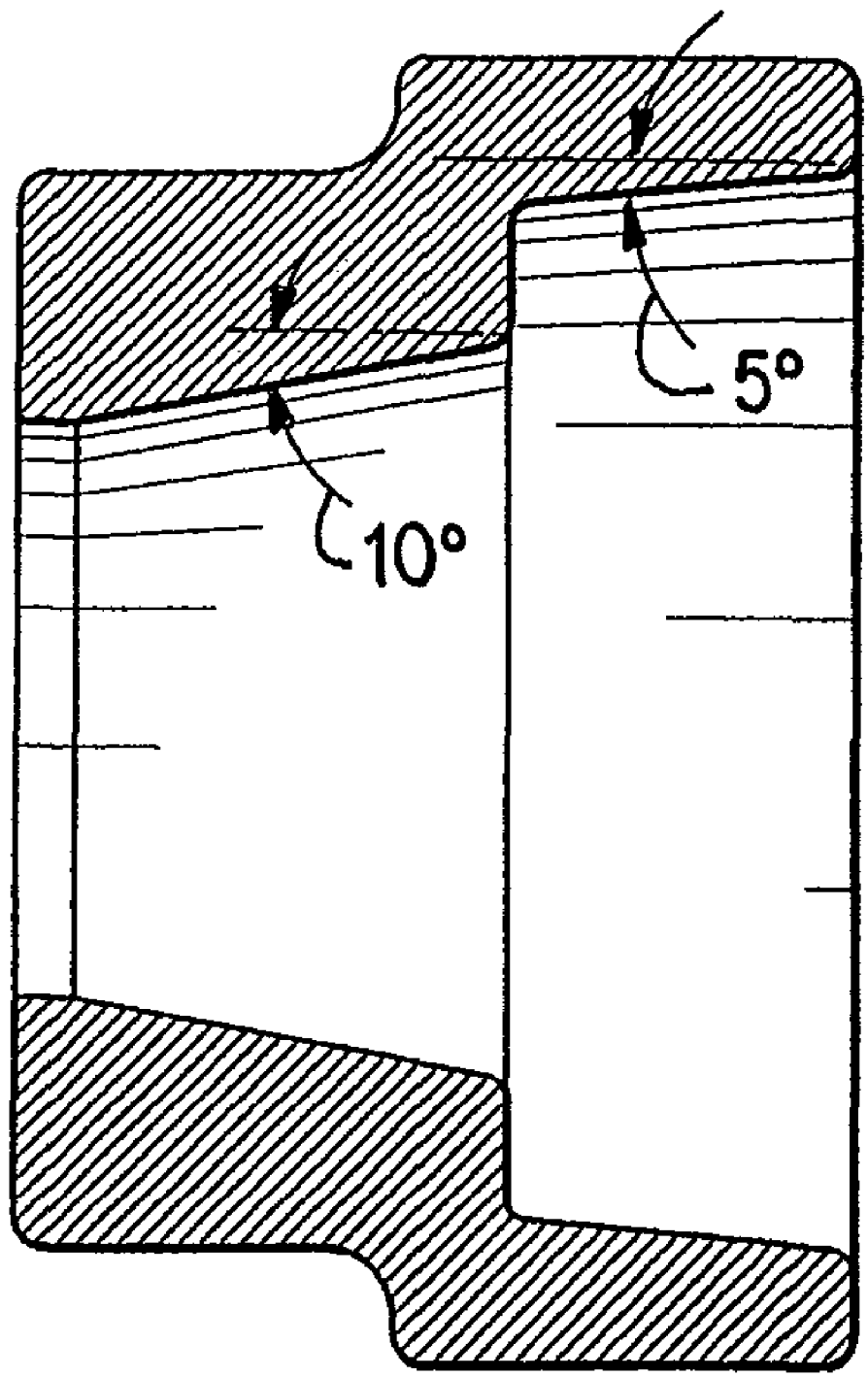
FIG. 10 illustrates front sun gear hub forging.

8. Front sun gear hub 126 (FIGS. 9*a*-9*c*)

| | |
|---|---|
| A. Number of teeth (OD) | 12 |
| B. Module | 5.25 |
| C. Pressure angle | 20 |
| D. Helix angle | 0 Spur |
| E. Hand | 0 Spur |
| F. Major diameter | 70.45 |
| G. Minor diameter | 66.25 |

| Internal Spline Data. | |
|---|---|
| A. Number of teeth | 26 |
| B. Module | 1.5 |
| C. Pressure angle | 18 |
| D. Major diameter | 42.80 |
| E. Minor diameter | 38.65 |
| F. Helix angle | 18.20 |
| G. Hand | Right |
| H. Material | SAE 4140 |

Figure 11B:
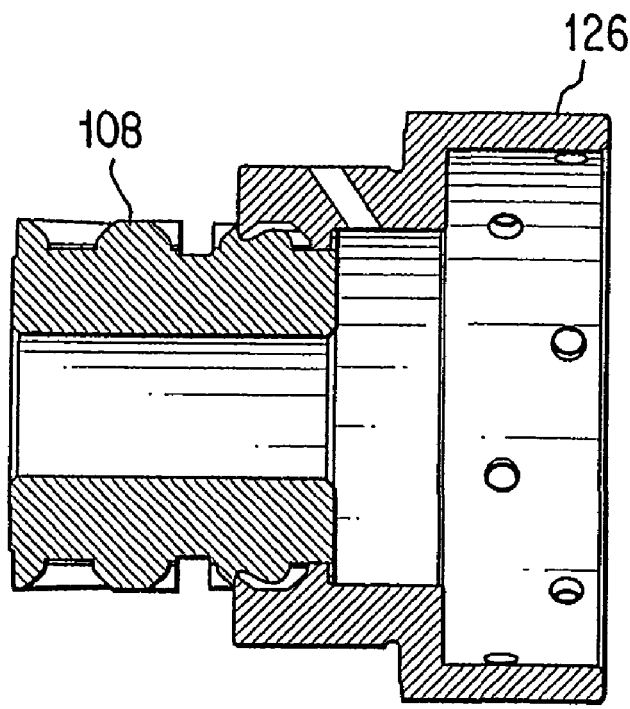
FIGS. 11a-11b illustrate a sun gear and hub assembly.
Figure 11A:
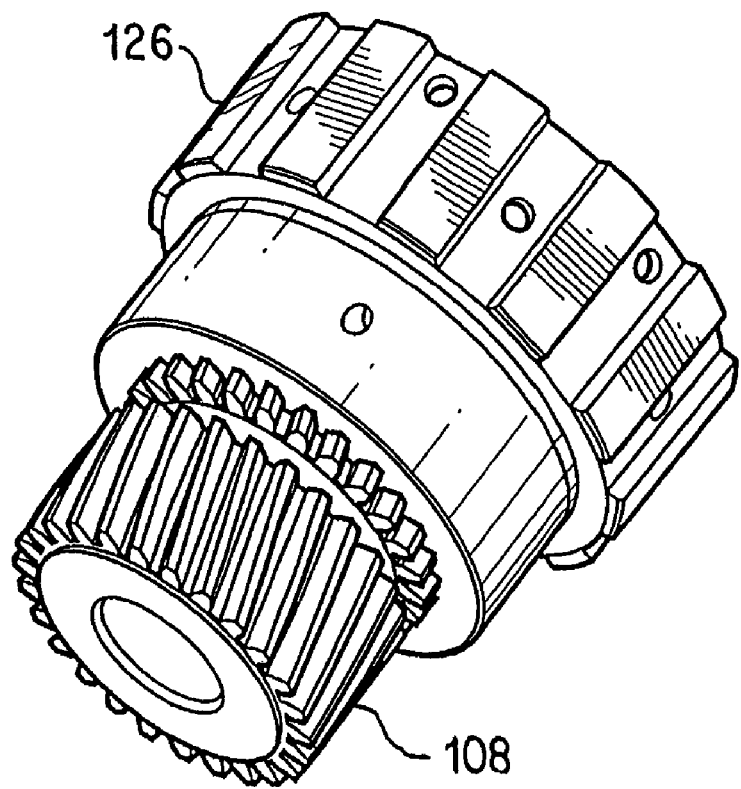
Figure 12B:
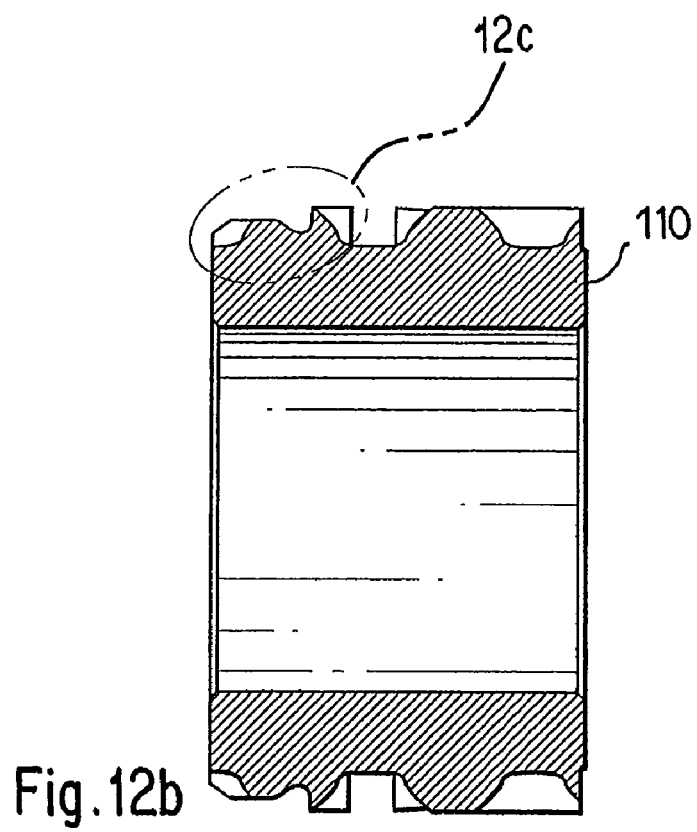
FIGS. 12-12c illustrate a rear sun gear, with FIG. 12a showing the gear in perspective, FIG. 12b showing the gear in cross section, FIG. 12c showing a detail 12c of FIG. 12b, and FIG. 12d showing its parameters.
Figure 12C:
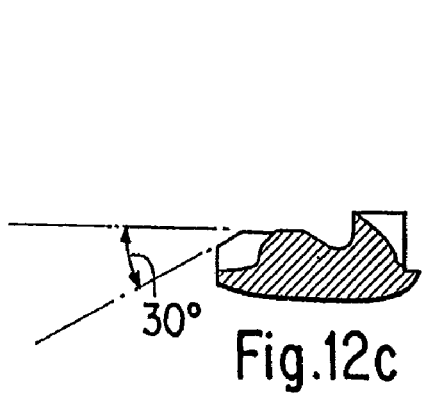
Figure 12A:
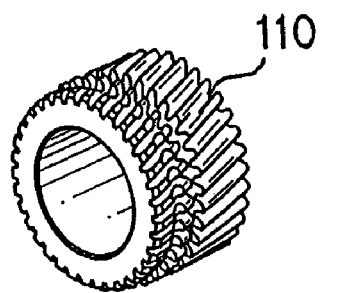
Figure 13B:
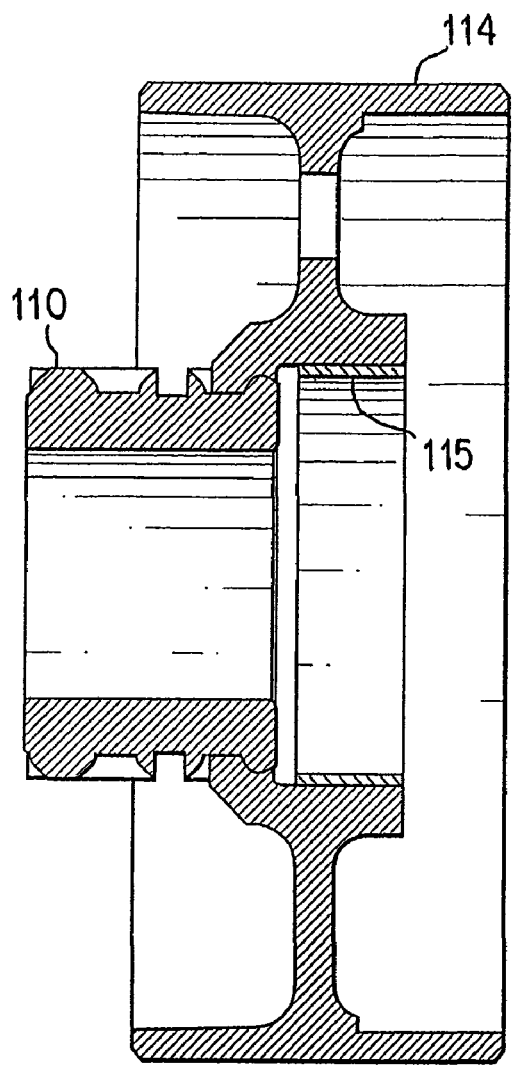
FIGS. 13a-13b illustrate an assembled rear sun gear.
Figure 13A:
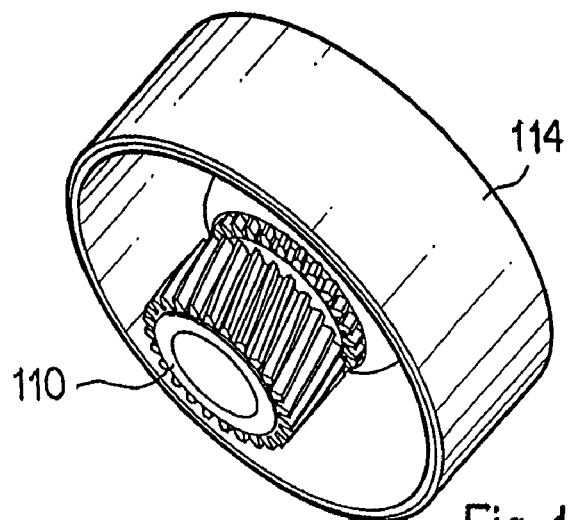

9. Sun gear 108 and hub 126 assembly (FIGS. 11*a*-11*b*)
10. Rear sun gear 110 (FIGS. 12*a*-12*c*)

| | |
|---|---|
| A. Number of teeth | 34 |
| B. Module | 1.5 |
| C. Pressure angle | 18 |
| D. Helix angle | 18.16 |
| E. Hand | Left |
| F. Major diameter | 57.42 |
| G. Minor diameter | 50.65 |
| H. Material | SAE 8620 |

Figure 14A:
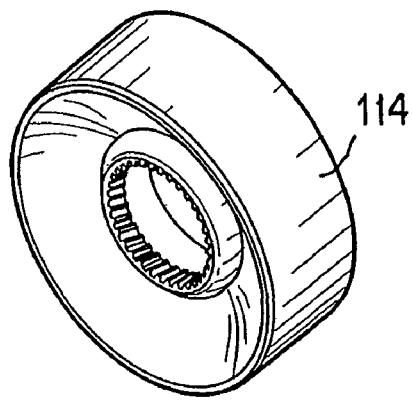
Figure 14C:
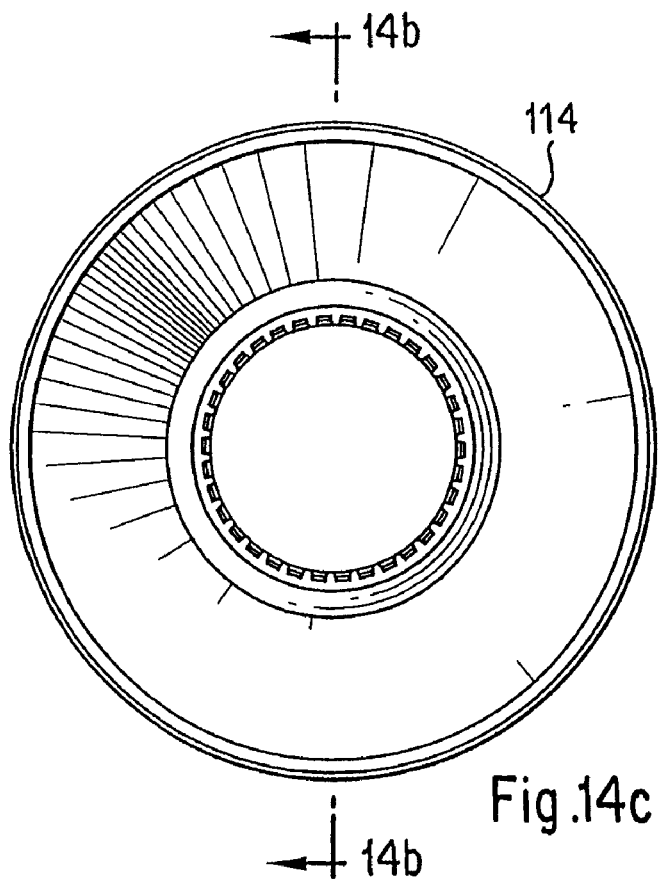
Figure 14B:
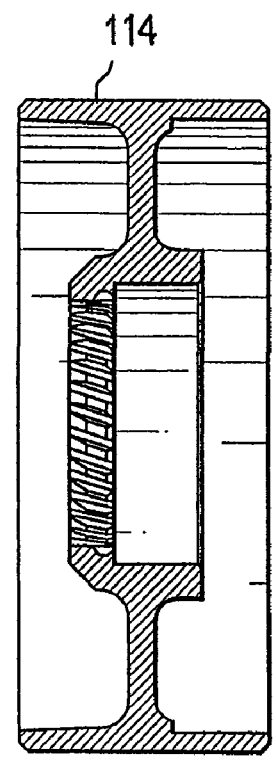
Figure 16B:
FIGS. 16a-16b illustrate a ring gear forging.
Figure 16A:
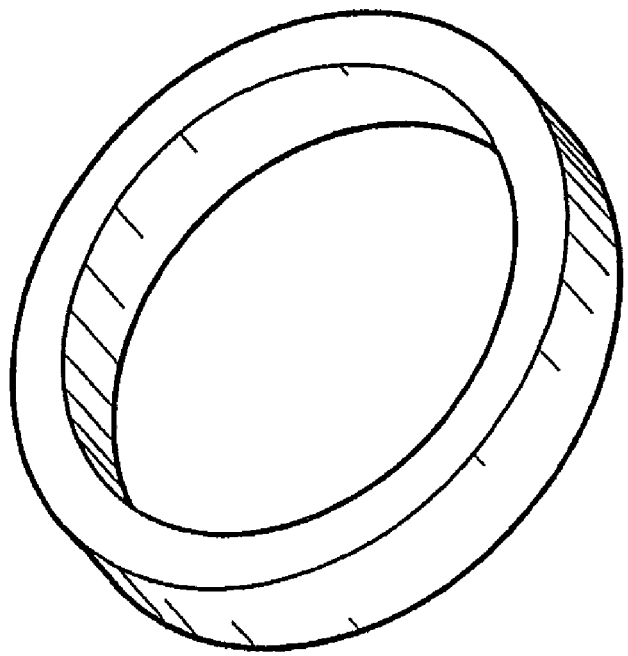

11. Rear band drum 114 (FIGS. 14a-14c)

| | |
|---|---|
| A. Number of teeth | 34 |
| B. Module | 1.5 |
| C. Pressure angle | 18 |
| D. Helix angle | 18.15 |
| E. Major diameter | 51.25 |
| F. Minor diameter | 55.34 |
| G. Material | FC250 |

12. Rear sun gear 110 and band drum 114 assembly
13. Ring gear 112 (FIGS. 15a-15e)

| Internal Gear Specifications | |
|---|---|
| A. Number of teeth | 74 |
| B. Diametrical pitch | 17 |
| C. Pressure angle | 18 |
| D. Helix angle | 18.16 |
| E. Hand | left |
| F. Material | SAE 1045 |

| External Specifications | |
|---|---|
| A. Number of teeth | 36 |
| B. Module | 3.83245 |
| C. Pressure angle | 24.33' 36" |
| D. Major diameter | 138.070 |
| E. Minor diameter | 132.92 |
| F. Material | SAE 1045 |

The unique angle of the gear pitch, the number and diameter of the pinion gears, the size of the front and rear sun gear and the ring gear allow for the transmission of no less than thirty-three percent more torque. This unique design and combination of parts is the first of its kind. Current design of the 180C transmission gear train incorporates six pinion gears. Three of which are compound and three that are single. The 280PS™ transmission incorporates eight pinion gears, four of which 102 are compound, and four of which 104 are single. The addition of one or more of the pinion gears in the gear train 100 reduces the amount of torque that each gear must transfer by one-third. Thus, increasing the torque bearing capacity of the gear train by 33%. Current testing has established that the eight pinion planetary with the unique gear cut angle, as disclosed herein, performs quieter and for a longer period of time than the current six pinion OEM design. The transmission will function a minimum of thirty-three percent longer than the current 180C transmission.

EXAMPLE 2

The 180C automatic transmission was tested and compared to an automatic transmission in accordance with instant invention, the 280PS™ transmission. The testing protocol was designed to reproduce 180C field failures, create a worn or failed gear train, provide indicators of wear/failure, provide fluid sample, analyze pressure, temperature, noise, and vibration. The test protocol accelerated years of field wear into the test period A computer algorithm was designed to automate the test. The program ran 11 cycles/hour, each consisting of four shifts in first and second gear. This produced high torque and RPM and created high fluid temperatures.

Each cycle was as follows:
Start in 1st Gear
Ramp input speed from 850 RPM to 3500 RPM
Add output torque of 375 lb-ft, hold for 40 seconds
Remove load, but maintain input speed of 3500 RPM
Shift to 2nd Gear
Use vacuum to induce 1-2 shift
Apply 375 lb-ft torque, hold for 50 seconds
Release load and drop input speed to 700 RPM
Use vacuum to induce 2-1 downshift
Repeat first and second gear cycle described above
Go to 850 RPM idle, wait 5 seconds, end test cycle
Start next cycle As part of the test protocol, each transmission ran for up to 1500 cycles. Fluid samples were taken every 30 cycles and evaluated. Speeds, loads, temperatures and pressures were recorded during every cycle.

Figure 41:
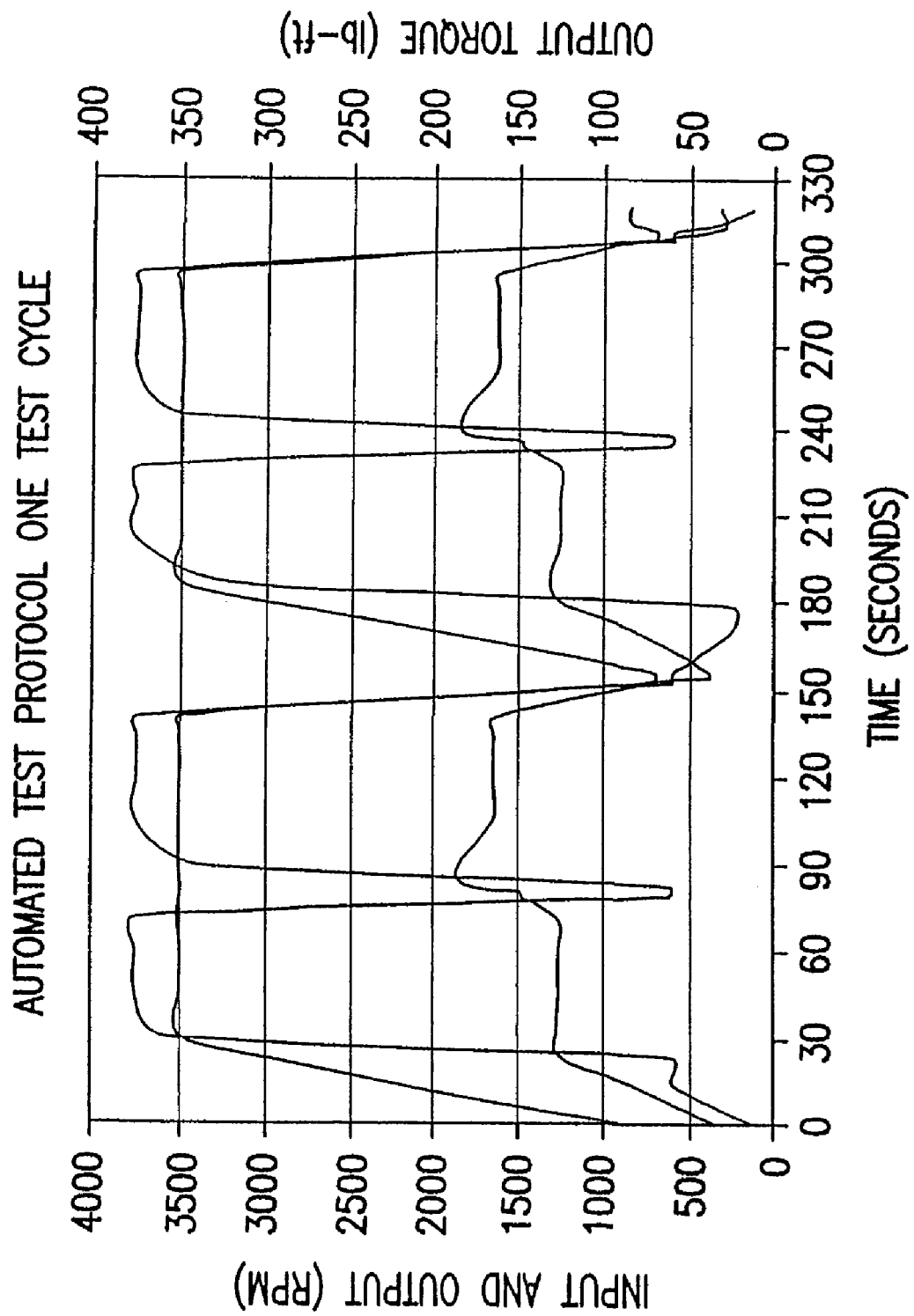
FIG. 41 illustrates the cycles of the automated test protocol.
Figure 42:
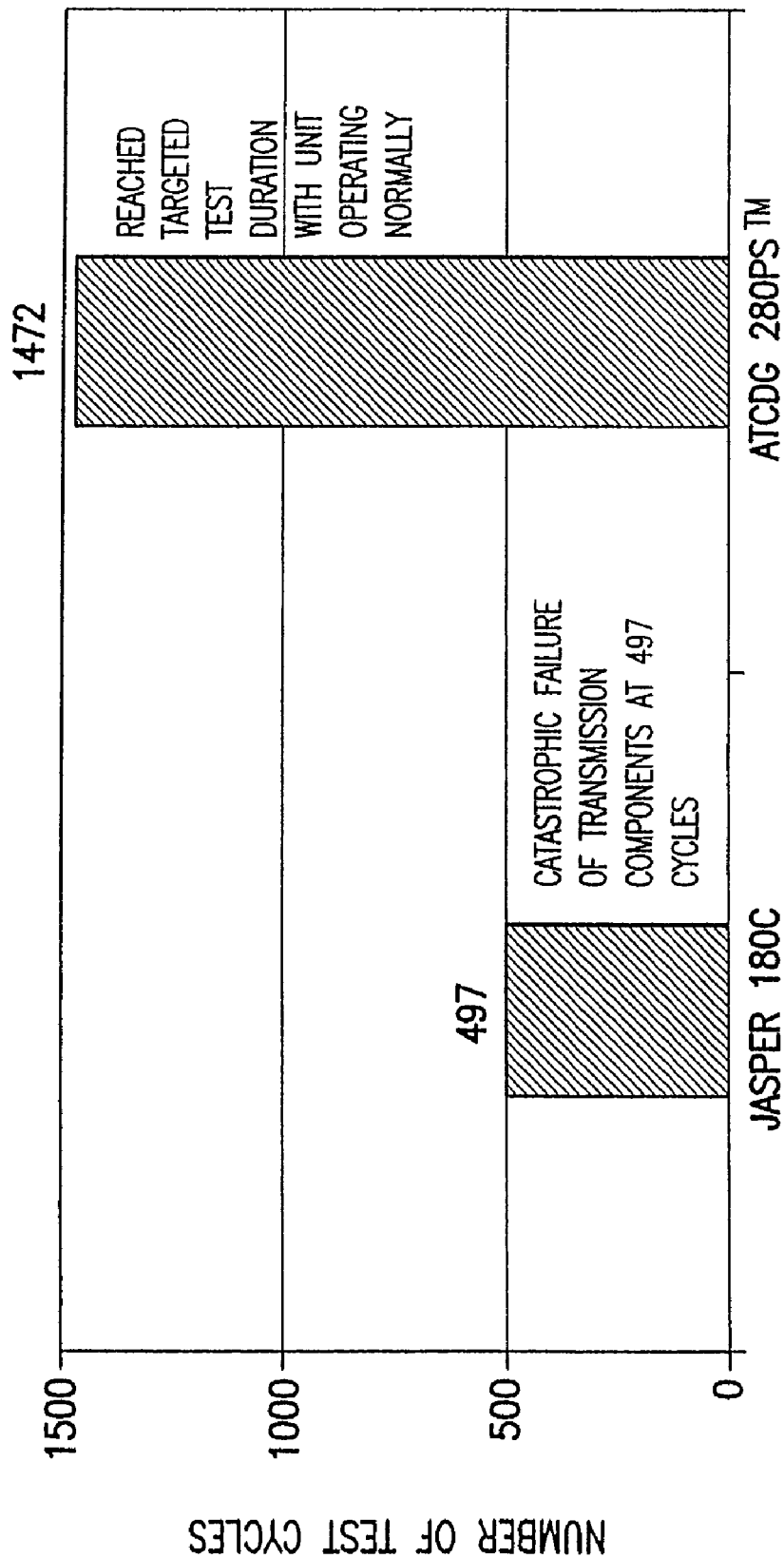
FIG. 42 illustrates a comparison of the durability of the 180c transmission and the 280PS transmission.
Figure 43:
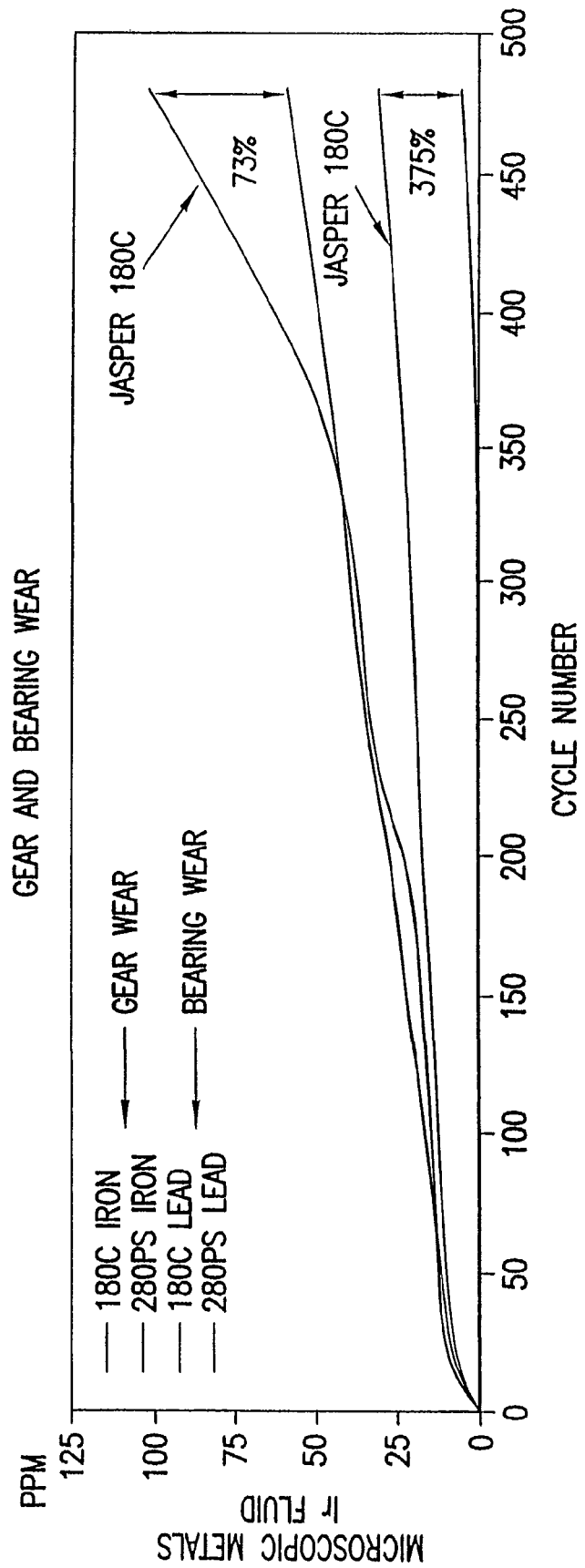
FIG. 43 illustrates a comparison of the gear wear of the 180c transmission and the 280PS transmission.

FIGS. 41-43 illustrate the results of these tests.

The 280PS™ operated normally through 1472 cycles, or three times the life of the 180C unit, which failed catastrophically at 497 cycles. At the time of its failure, the 180C unit had 75% more iron in the fluid (indicative of gear wear) and 375% more lead in the fluid (indicative of bearing wear) than the 280PS™.

While the invention has been described with an emphasis on particular embodiments thereof, those skilled in the art may make various modifications to the described embodiments of the invention without departing from the scope of the invention. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

The invention claimed is:

1. An automatic transmission having a conventional planetary gear system modified by a process comprising:
    (a) increasing a number of pinion gears between sun and ring gears of the planetary gear system in order to delay beginning of gear spalling;
    (b) inserting a metal sleeve in a housing of a transmission pump in an area of an outer gear;
    (c) altering a geometry of an inner pump crescent to create a clearance between an inner gear and a leading edge of the inner pump crescent; and
    (d) modifying an oil lubrication circuit to allow a constant flow of oil from a pressure port to a lubrication port.

2. The automatic transmission of claim 1, further comprising replacing a low servo spring with another low servo spring with reduced tension.

3. The automatic transmission of claim 1, wherein the automatic transmission having the conventional planetary gear system is a 180C transmission.

4. The automatic transmission of claim 1, wherein the number of pinion gears is increased to eight pinion gears.

5. The automatic transmission of claim 4, wherein the eight pinion gears include four single pinion gears and four compound pinion gears.

* * * * *